US005850632A

United States Patent [19]
Robertson

[11] Patent Number: 5,850,632
[45] Date of Patent: Dec. 15, 1998

[54] MEMORY ACCESS CONTROLLER UTILIZING CACHE MEMORY TO STORE CONFIGURATION INFORMATION

[75] Inventor: Iain Robertson, Cople, England

[73] Assignee: Texas Instruments Incorporated, Dallas, Tex.

[21] Appl. No.: 706,619

[22] Filed: Sep. 6, 1996

Related U.S. Application Data

[60] Provisional application No. 60/003,495 Sep. 8, 1995.
[51] Int. Cl.[6] ...................................................... G06F 12/08
[52] U.S. Cl. .......................... 711/170; 711/171; 711/172; 711/173; 711/118; 711/136
[58] Field of Search .............................. 711/170, 171, 711/172, 173, 118, 136

[56] References Cited

U.S. PATENT DOCUMENTS

| | | | |
|---|---|---|---|
| 5,263,148 | 11/1993 | Jones, Jr., et al. | 395/651 |
| 5,307,320 | 4/1994 | Farrer et al. | 365/230.01 |
| 5,487,146 | 1/1996 | Guttag et al. | 395/516 |
| 5,548,737 | 8/1996 | Edrington et al. | 395/376 |

Primary Examiner—Tod R. Swann
Assistant Examiner—J. Peikari
Attorney, Agent, or Firm—Robert D. Marshall, Jr.; James C. Kesterson; Richard L. Donaldson

[57] ABSTRACT

A digital data processing system adapts to plural memories having differing address ranges and requiring differing sets of memory access parameters. A memory configuration cache having a stores a plurality of memory configuration cache entries, each including an address range and a corresponding set of memory access parameters. Each generated external address is compared to the address ranges of the memory configuration cache entries. If the external address matches the address range of any one of said memory configuration cache entries, then the corresponding set of memory access parameters is selected for control of the external memory access. If there is no match, then a memory configuration cycle outputs the external address to a memory configuration cache service unit. The memory configuration cache service unit supplies the address range and the set of memory access parameters corresponding to the memory encompassing the address received during the memory configuration cycle. The memory configuration cache stores the new memory configuration cache entry, replacing a prior cache entry if the cache is full. The newly received set of memory access parameters are then used to control the memory access.

34 Claims, 8 Drawing Sheets

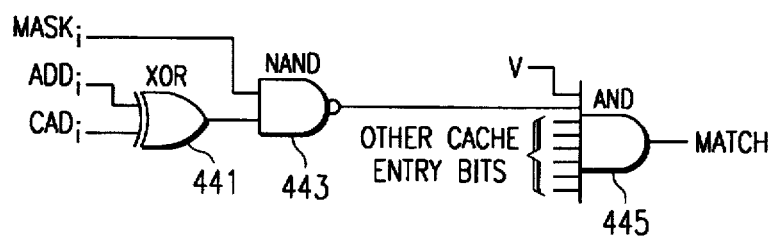
FIG. 7
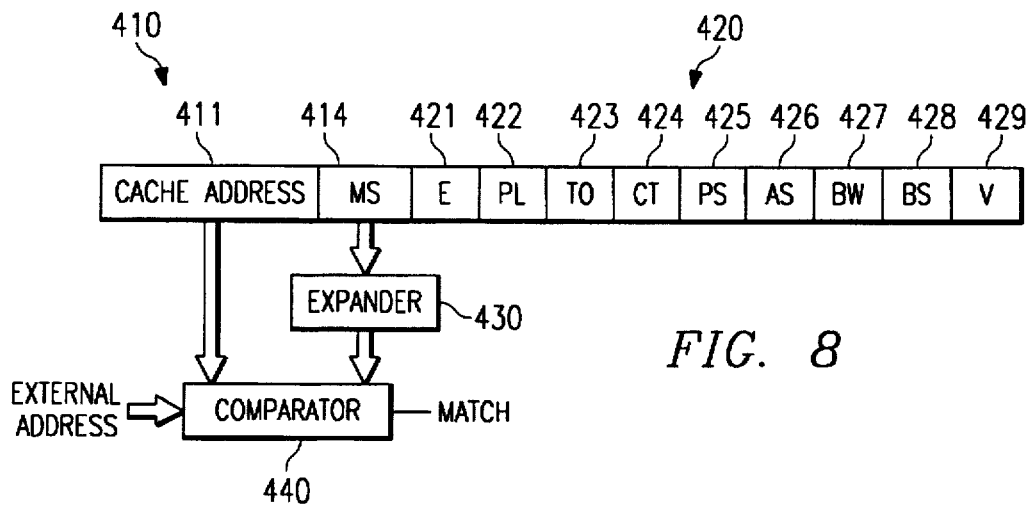
FIG. 8
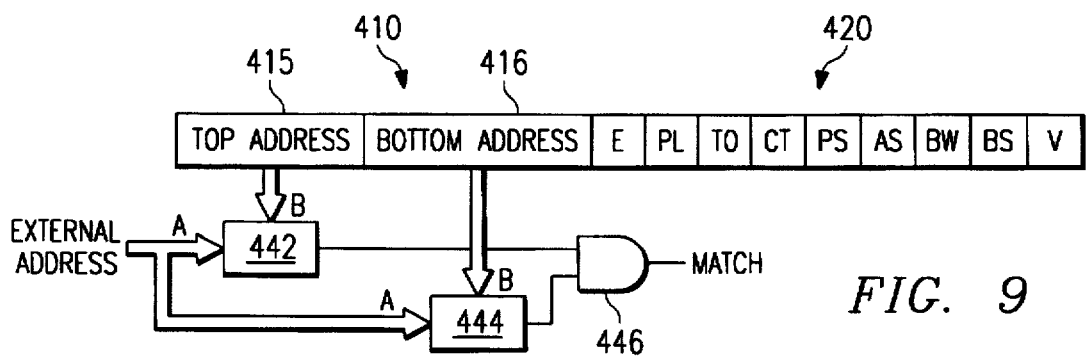
FIG. 9
FIG. 10

MEMORY ACCESS CONTROLLER UTILIZING CACHE MEMORY TO STORE CONFIGURATION INFORMATION

NOTICE

© Copyright, ™ Texas Instruments Incorporated 1995. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

CROSS REFERENCE TO RELATED APPLICATIONS

This application relates to improvements in the inventions disclosed in the following patents and copending U.S. patent applications, all of which are assigned to Texas Instruments and all of which are incorporated by reference:

U.S. patent application Ser. No. 08/263,504 Jun. 21, 1994 entitled "MULTI-PROCESSOR WITH CROSSBAR LINK OF PROCESSORS AND MEMORIES AND METHOD OF OPERATION", now U.S. Pat. No. 5,471,592 issued Nov. 28, 1995 a continuation of U.S. patent application Ser. No. 08/135,754 filed Oct. 12, 1993 and now abandoned, a continuation of U.S. patent application Ser. No. 07/933,865 filed Aug. 21, 1992 and now abandoned, which is a continuation of U.S. patent application Ser. No. 07/435,591 filed Nov. 17, 1989 and now abandoned;

U.S. Pat. No. 5,212,777, issued May 18, 1993, filed Nov. 17, 1989 and entitled "SIMD/MIMD RECONFIGURABLE MULTI-PROCESSOR AND METHOD OF OPERATION";

U.S. patent application Ser. No. 08/264,111 filed Jun. 22, 1994 entitled "RECONFIGURABLE COMMUNICATIONS FOR MULTI-PROCESSOR AND METHOD OF OPERATION," now U.S. Pat. No. 5,522,083 issued May 28, 1996, a continuation of U.S. patent application Ser. No. 07/895,565 filed Jun. 5, 1992 and now abandoned, a continuation of U.S. patent application Ser. No. 07/437,856 filed Nov. 17, 1989 and now abandoned;

U.S. patent application Ser. No. 08/264,582 filed Jun. 22, 1994 entitled "REDUCED AREA OF CROSSBAR AND METHOD OF OPERATION", a continuation of U.S. patent application Ser. No. 07/437,852 filed Nov. 17, 1989 and now abandoned;

U.S. patent application Ser. No. 08/032,530 filed Mar. 15, 1993 entitled "SYNCHRONIZED MIMD MULTI-PROCESSING SYSTEM AND METHOD OF OPERATION," a continuation of U.S. patent application Ser. No. 07/437,853 filed Nov. 17, 1989 and now abandoned;

U.S. Pat. No. 5,197,140 issued Mar. 23, 1993 filed Nov. 17, 1989 and entitled "SLICED ADDRESSING MULTI-PROCESSOR AND METHOD OF OPERATION";

U.S. Pat. No. 5,339,447 issued Aug. 16, 1994 filed Nov. 17, 1989 entitled "ONES COUNTING CIRCUIT, UTILIZING A MATRIX OF INTERCONNECTED HALF-ADDERS, FOR COUNTING THE NUMBER OF ONES IN A BINARY STRING OF IMAGE DATA";

U.S. Pat. No. 5,239,654 issued Aug. 24, 1993 filed Nov. 17, 1989 and entitled "DUAL MODE SIMD/MIMD PROCESSOR PROVIDING REUSE OF MIMD INSTRUCTION MEMORIES AS DATA MEMORIES WHEN OPERATING IN SIMD MODE";

U.S. Pat. No. 5,410,649 issued Apr. 25, 1995 filed Jun. 29, 1992 entitled "IMAGING COMPUTER AND METHOD OF OPERATION", a continuation of U.S. patent application Ser. No. 07/437,854 filed Nov. 17, 1989 and now abandoned;

U.S. Pat. No. 5,226,125 issued Jul. 6, 1993 filed Nov. 17, 1989 and entitled "SWITCH MATRIX HAVING INTEGRATED CROSSPOINT LOGIC AND METHOD OF OPERATION".

U.S. patent application Ser. No. 08/486,562 filed Jun. 7, 1995, now U.S. Pat. No. 5,696,954 issued Dec. 9, 1997, a continuation of Ser. No. 08/160,299 filed Nov. 30, 1993 and entitled "THREE INPUT ARITHMETIC LOGIC UNIT WITH BARREL ROTATOR";

U.S. Pat. No. 5,640,578 issued Jun. 17, 1997 filed Nov. 30, 1993 and entitled "ARITHMETIC LOGIC UNIT HAVING PLURAL INDEPENDENT SECTIONS AND REGISTER STORING RESULTANT INDICATOR BIT FROM EVERY SECTION";

U.S. patent application Ser. No. 08/478,129 filed Jun. 7, 1995, now U.S. Pat. No. 5,696,959 issued Dec. 9, 1997, a continuation of U.S. patent application Ser. No. 08/160,118 filed Nov. 30, 1993 "MEMORY STORE FROM A REGISTER PAIR CONDITIONAL";

U.S. patent application Ser. No. 08/324,323 filed Oct. 17, 1994 and entitled "ITERATIVE DIVISION APPARATUS, SYSTEM AND METHOD FORMING PLURAL QUOTIENT BITS PER ITERATION" now U.S. Pat. No. 5,442,581 issued Aug. 15, 1995, a continuation of U.S. patent application Ser. No. 08/160,115 concurrently filed with this application and now abandoned;

U.S. Pat. No. 5,596,763 issued Jan. 21, 1997 filed Nov. 30, 1993 and entitled "THREE INPUT ARITHMETIC LOGIC UNIT FORMING MIXED ARITHMETIC AND BOOLEAN COMBINATIONS";

U.S. patent application Ser. No. 08/160,119 filed Nov. 30, 1993 and entitled "METHOD, APPARATUS AND SYSTEM FORMING THE SUM OF DATA IN PLURAL EQUAL SECTIONS OF A SINGLE DATA WORD";

U.S. Pat. No. 5,512,896 issued Apr. 30, 1996 filed Nov. 30, 1993 and entitled "HUFFMAN ENCODING METHOD, CIRCUITS AND SYSTEM EMPLOYING MOST SIGNIFICANT BIT CHANGE FOR SIZE DETECTION";

U.S. Pat. No. 5,479,166 issued Dec. 26, 1995 filed Nov. 30, 1993 and entitled "HUFFMAN DECODING METHOD, CIRCUIT AND SYSTEM EMPLOYING CONDITIONAL SUBTRACTION FOR CONVERSION OF NEGATIVE NUMBERS";

U.S. patent application Ser. No. 08/160,112 filed Nov. 30, 1993 and entitled "METHOD, APPARATUS AND SYSTEM FOR SUM OF PLURAL ABSOLUTE DIFFERENCES";

U.S. Pat. No. 5,644,524 issued Jul. 1, 1997 filed Nov. 30, 1993 and entitled "ITERATIVE DIVISION APPARATUS, SYSTEM AND METHOD EMPLOYING LEFT MOST ONE'S DETECTION AND LEFT MOST ONE'S DETECTION WITH EXCLUSIVE OR";

U.S. patent application Ser. No. 08/160,114 filed Nov. 30, 1993 and entitled "ADDRESS GENERATOR EMPLOYING SELECTIVE MERGE OF TWO INDEPENDENT ADDRESSES";

U.S. Pat. No. 5,420,809 issued May 30, 1995 filed Nov. 30, 1993 and entitled "METHOD, APPARATUS AND SYSTEM METHOD FOR CORRELATION";

U.S. Pat. No. 5,509,129 issued Apr. 16, 1996 filed Nov. 30, 1993 and entitled "LONG INSTRUCTION WORD

CONTROLLING PLURAL INDEPENDENT PROCESSOR OPERATIONS";

U.S. patent application Ser. No. 08/159,346 filed Nov. 30, 1993 and entitled "ROTATION REGISTER FOR ORTHOGONAL DATA TRANSFORMATION";

U.S. patent application Ser. No. 08/159,652 filed Nov. 30, 1993 "MEDIAN FILTER METHOD, CIRCUIT AND SYSTEM";

U.S. patent application Ser. No. 08/159,344 filed Nov. 30, 1993 and entitled "ARITHMETIC LOGIC UNIT WITH CONDITIONAL REGISTER SOURCE SELECTION";

U.S. patent application Ser. No. 08/160,301 filed Nov. 30, 1993 and entitled "APPARATUS, SYSTEM AND METHOD FOR DIVISION BY ITERATION"

U.S. Pat. No. 5,644,522 issued Jul. 1, 1997 filed Nov. 30, 1993 and entitled "MULTIPLY ROUNDING USING REDUNDANT CODED MULTIPLY RESULT";

U.S. Pat. No. 5,446,651 issued Aug. 29, 1995 filed Nov. 30, 1993 and entitled "SPLIT MULTIPLY OPERATION";

U.S. patent application Ser. No. 08/482,697 filed Jun. 7, 1995 now U.S. Pat. No. 5,689,695 issued Nov. 18, 1997, a continuation of U.S. patent application Ser. No. 08/158,741 filed Nov. 30, 1993 and entitled "MIXED CONDITION TEST CONDITIONAL AND BRANCH OPERATIONS INCLUDING CONDITIONAL TEST FOR ZERO";

U.S. patent application Ser. No. 08/472,828 filed Jun. 7, 1995 now U.S. Pat. No. 5,606,677 issued Feb. 25, 1997 and entitled "PACKED WORD PAIR MULTIPLY OPERATION";

U.S. patent application Ser. No. 08/160,573 filed Nov. 30, 1993 and entitled "THREE INPUT ARITHMETIC LOGIC UNIT WITH SHIFTER U.S. Pat. No. 5,590,350 issued Dec. 31, 1996 filed Nov. 30, 1993 and entitled "THREE INPUT ARITHMETIC LOGIC UNIT WITH MASK GENERATOR";

U.S. patent application Ser. No. 08/475,134 filed Jun. 7, 1995 now U.S. Pat. No. 5,634,065 issued May 27, 1997, a continuation of U.S. patent application Ser. No. 08/160,111 filed Nov. 30, 1993 and entitled "THREE INPUT ARITHMETIC LOGIC UNIT WITH BARREL ROTATOR AND MASK GENERATOR";

U.S. patent application Ser. No. 08/160,298 filed Nov. 30, 1993 and entitled "THREE INPUT ARITHMETIC LOGIC UNIT WITH SHIFTER AND MASK GENERATOR";

U.S. Pat. No. 5,485,411 issued Jan. 16, 1996 filed Nov. 30, 1993 and entitled "THREE INPUT ARITHMETIC LOGIC UNIT FORMING THE SUM OF A FIRST INPUT ADDED WITH A FIRST BOOLEAN COMBINATION OF A SECOND INPUT AND THIRD INPUT PLUS A SECOND BOOLEAN COMBINATION OF THE SECOND AND THIRD INPUTS";

U.S. Pat. No. 5,465,224 issued Nov. 7, 1995 filed Nov. 30, 1993 and entitled "THREE INPUT ARITHMETIC LOGIC UNIT FORMING THE SUM OF FIRST BOOLEAN COMBINATION OF FIRST, SECOND AND THIRD INPUTS PLUS A SECOND BOOLEAN COMBINATION OF FIRST, SECOND AND THIRD INPUTS";

U.S. patent application Ser. No. 08/426,992 filed Apr. 24, 1995 now U.S. Pat. No. 5,493,524 issued Feb. 20, 1996 and entitled "THREE INPUT ARITHMETIC LOGIC UNIT EMPLOYING CARRY PROPAGATE LOGIC";

U.S. patent application Ser. No. 08/160,300 filed Nov. 30, 1993 and entitled "DATA PROCESSING APPARATUS, SYSTEM AND METHOD FOR IF, THEN, ELSE OPERATION USING WRITE PRIORITY";

U.S. Pat. No. 5,673,407 issued Sep. 30, 1997 filed Mar. 8, 1994 and entitled "DATA PROCESSOR HAVING CAPABILITY TO PERFORM BOTH FLOATING POINT OPERATIONS AND MEMORY ACCESS IN RESPONSE TO A SINGLE INSTRUCTION";

U.S. Pat. No. 5,487,022 issued Jan. 23, 1996 filed Mar. 8, 1994 and entitled "NORMALIZATION METHOD FOR FLOATING POINT NUMBERS";

U.S. Pat. No. 5,560,030 issued Sep. 24, 1996 filed Mar. 8, 1994 and entitled "TRANSFER PROCESSOR WITH TRANSPARENCY";

U.S. Pat. No. 5,493,646 issued Feb. 20, 1996 filed Mar. 8, 1994 and entitled "PIXEL BLOCK TRANSFER WITH TRANSPARENCY";

U.S. patent application Ser. No. 08/208,171 filed Mar. 8, 1994 and entitled "MESSAGE PASSING AND BLAST INTERRUPT FROM PROCESSOR";

U.S. Pat. No. 5,651,127 issued Jul. 22, 1997 filed Mar. 8, 1994 and entitled "GUIDED TRANSFERS WITH X,Y DIMENSION AND VARIABLE STEPPING";

U.S. Pat. No. 5,487,146 issued Jan. 23, 1996 filed Mar. 8, 1994 and entitled "PLURAL MEMORY ACCESS ADDRESS GENERATION EMPLOYING GUIDE TABLES ENTRIES FORMING LINKED LIST";

U.S. patent application Ser. No. 08/208,517 filed Mar. 8, 1994 and entitled "TRANSFER PROCESSOR MEMORY INTERFACE CONTROLS DIFFERENT MEMORY TYPES SIMULTANEOUSLY";

U.S. Pat. No. 5,524,265 issued Jun. 6, 1996 filed Mar. 8, 1994 and entitled "ARCHITECTURE OF TP TRANSFER PROCESSOR";

U.S. patent application Ser. No. 08/399,083 filed Mar. 8, 1995 and entitled "LEFT AND RIGHT JUSTIFICATION OF SINGLE PRECISION MANTISSA";

U.S. Pat. No. 5,630,160 issued May 13, 1997 filed Mar. 8, 1995 and entitled "FLOATING POINT EXPONENT COMPARE USING REPEATED TWO BIT COMPARE CELL";

U.S. Pat. No. 5,502,401 issued Mar. 26, 1996 filed Mar. 8, 1995 and entitled "CONTROLLABLE WIDTH OR GATE".

This application relates to contemporaneously filed U.S. patent application Ser. No. 08/706,618 filed Sep. 6, 1996 claiming priority from provisional application serial no. 60/003,472 filed Sep. 8, 1995 and entitled "MEMORY CACHE WITH MULTILEVEL HIERARCHY LEAST RECENTLY USED CACHE ENTRY REPLACEMENT".

TECHNICAL FIELD OF THE INVENTION

The technical field of this invention is the field of digital data processing and more particularly microprocessor circuits, architectures and methods for digital data processing especially digital image/graphics processing.

BACKGROUND OF THE INVENTION

All microprocessors require some form of interface to off-chip memory and peripherals. There have been several different approaches taken in the prior art to achieve this. These are providing a simple generic interface, providing an interface to a specific memory device type and providing an adaptable memory interface.

Providing the microprocessor with a fairly simple generic interface has the advantage of being easy to design and uses relatively few device pins. This enables a low cost design of the microprocessor. Because the memory interface is not targeted at any particular memory or peripheral devices, almost any system using the microprocessor will require external hardware to customize the generic interface to the specific requirements of the memories used. This makes the system cost greater. Furthermore, it may be difficult to use the memory devices to their full potential using the external hardware.

Providing the microprocessor with an interface for a specific memory device is also simple to design and economical in device pins. It will result in a simple system design with minimal external hardware, but only if the system is constructed using the memory devices of the type for which the interface is constructed. For a microprocessor not targeted at a specific well defined set of applications, this limitation is probably too restrictive. Using the microprocessor with memories other than those for which the interface is targeted will require external system hardware as in the case of a generic interface. It may also be difficult to use the memory devices to their full potential. Furthermore, it becomes difficult to take advantage of improvements in memory technology over the lifetime of the microprocessor. It is possible to provide the same microprocessor core with differing memory interfaces, but this requires plural designs and stocking more than one highly similar part.

Using an adaptable interface a microprocessor can provide direct support for several different types of memory device. This allows a wide variety of applications to be supported without making any assumptions about how systems designers will want to use the microprocessor. The general principle behind an adaptable memory interface is that external hardware decodes the address output by the processor and returns information to the processor about the type of memory at that address location. The processor uses this information in order that the processor can access that memory appropriately. This is the approach taken by the Texas Instruments TMS320C80. The scheme currently employed is designed around DRAM-like memory cycles consisting of a row access and a number of column accesses. Every time a new row access is required, the external hardware must provide a new configuration via a number of input pins. The Texas Instruments TMS320C80 provides 13 input pins for external hardware to signal the new configuration. Although little external hardware is required between the processor and the memories, the extra input pins and the external decode logic required to control them both add extra cost to the system. Furthermore, the time required to decode the address output by the processor and set the input pins to the appropriate levels tends to reduce the overall bandwidth of the system.

SUMMARY OF THE INVENTION

This invention enables a digital data processing system to adapt to plural memories having differing address ranges and requiring differing sets of memory access parameters. A memory configuration cache stores a plurality of memory configuration cache entries. Each memory configuration cache entry includes an address range and a corresponding set of memory access parameters. The set of memory access parameters preferably includes an indication of one of a predetermined set of timing parameters, a page size, a data bus size, an indication of which bits to supply during a row address cycle and which bits to supply during a column address cycle for accessing a dynamic random access memory.

Each generated external address is compared to the address ranges of the memory configuration cache entries. If the external address matches the address range of any one of said memory configuration cache entries, then the corresponding set of memory access parameters is selected for control of the external memory access.

If the external address fails to match the address range of any memory configuration cache entry, then a memory configuration cycle is performed. The external address is output to a memory configuration cache service unit. The memory configuration cache service unit is connected to the system bus. The memory configuration cache service unit stores the predetermined address range and the predetermined set of memory access parameters for each memory. The memory configuration cache service unit supplies on the system bus the predetermined address range and the predetermined set of memory access parameters corresponding to the memory encompassing a particular memory address received from said system bus during a memory configuration cycle. In the preferred embodiment the memory configuration cache service unit supplies the address range and the set of memory access parameters in a plurality of data cycles employing less than all of the available data lines.

The memory configuration cache receives the new memory configuration cache entry from the memory configuration cache service unit and stores both the address range and the corresponding set of memory access parameters. The newly received set of memory access parameters are then used to control the memory access. If the memory configuration cache is full, then the newly received memory configuration cache entry replaces a prior stored memory configuration cache entry. This is preferably a least recently used prior memory configuration cache entry.

In the preferred embodiment the address range of each memory configuration cache entry is represented by an address and a memory bank size indicating the number of most significant bits to compare. The comparator checks to determine if the number of most significant bits of the external address equals the number of most significant bits of the stored address in the memory configuration cache entry. The address stored in the memory configuration cache entry is preferably the external address which triggered recall of that memory configuration cache entry.

In an alternative embodiment the address range of each memory configuration cache entry is represented by a top address and a bottom address. The comparator includes a first comparator detecting if the external address is less than or equal to said top address cache word and a second comparator detecting if the external address is greater than or equal to the bottom address cache word. An AND gate provides the comparator output indicating whether there is a match.

BRIEF DESCRIPTION OF THE FIGURES

These and other aspects of the preferred embodiment of the present invention are described below together with the Figures, in which:

FIG. 7 illustrates an exemplary bit circuit of the comparator of FIG. 6;

FIG. 8 illustrates an alternative to the circuits illustrated in FIG. 6;

FIG. 9 illustrates an additional alternative to the circuits illustrated in FIG. 6;

FIG. 10 illustrates the contents of the four 8 bit memory configuration cycles;

DETAILED DESCRIPTION OF PREFERRED EMBODIMENTS

Figure 1:
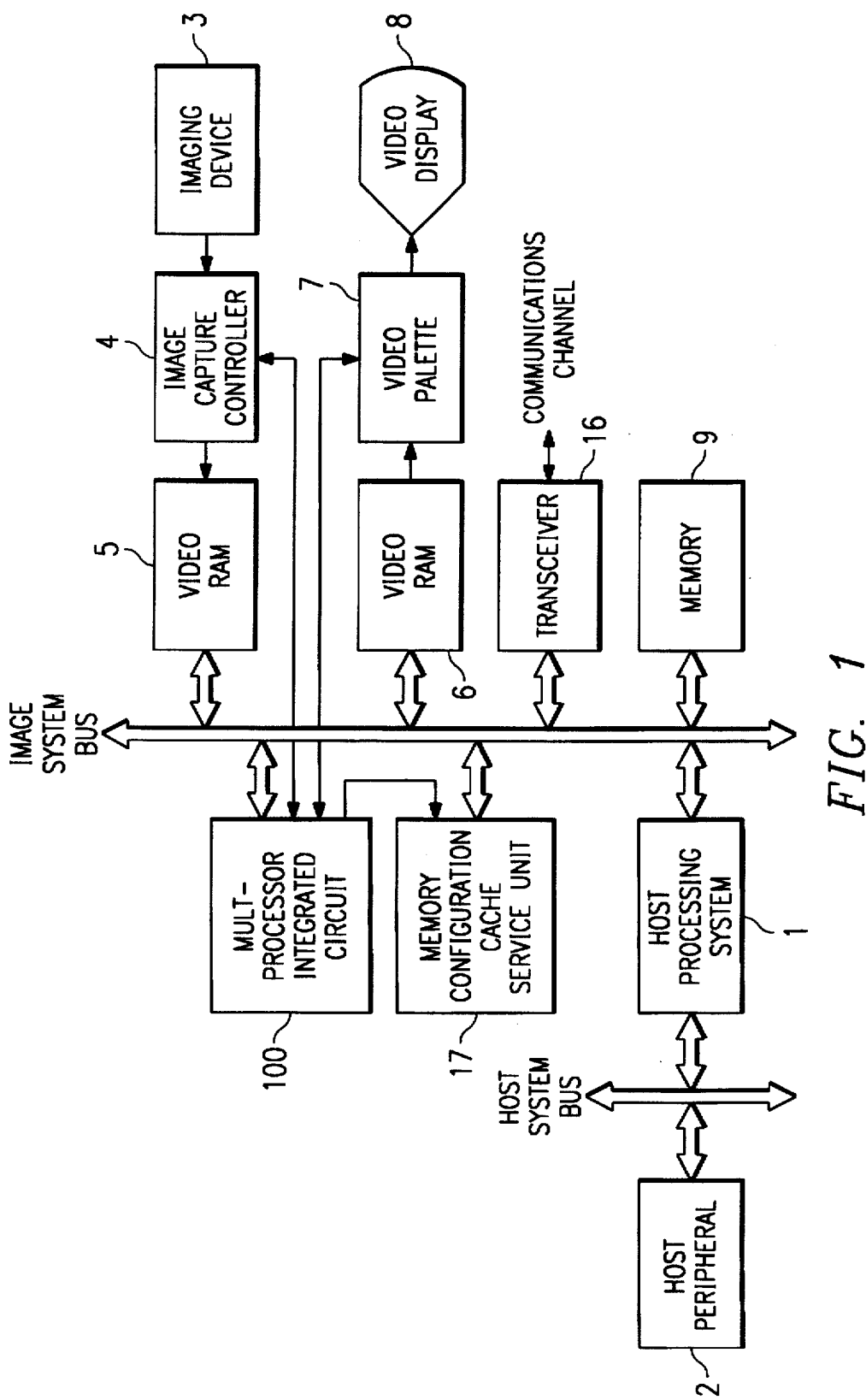
FIG. 1 illustrates the system architecture of an image processing system embodiment of this invention.

FIG. 1 is a block diagram of an image data processing system including a multiprocessor integrated circuit constructed for image and graphics processing according to this invention. This data processing system includes a host processing system 1. Host processing system 1 provides the data processing for the host system of data processing system of FIG. 1. Included in the host processing system 1 are a processor, at least one input device, a long term storage device, a read only memory, a random access memory and at least one host peripheral 2 coupled to a host system bus. Because of its processing functions, the host processing system 1 controls the function of the image data processing system.

Multiprocessor integrated circuit 100 provides most of the data processing including data manipulation and computation for image operations of the image data processing system of FIG. 1. Multiprocessor integrated circuit 100 is bi-directionally coupled to an image system bus and communicates with host processing system 1 by way of this image system bus. In the arrangement of FIG. 1, multiprocessor integrated circuit 100 operates independently from the host processing system 1. The multiprocessor integrated circuit 100, however, is responsive to host processing system 1.

FIG. 1 illustrates two image systems. Imaging device 3 represents a document scanner, charge coupled device scanner or video camera that serves as an image input device. Imaging device 3 supplies this image to image capture controller 4, which serves to digitize the image and form it into raster scan frames. This frame capture process is controlled by signals from multiprocessor integrated circuit 100. The thus formed image frames are stored in video random access memory 5. Video random access memory 5 may be accessed via the image system bus permitting data transfer for image processing by multiprocessor integrated circuit 100.

The second image system drives a video display. Multiprocessor integrated circuit 100 communicates with video random access memory 6 for specification of a displayed image via a pixel map. Multiprocessor integrated circuit 100 controls the image data stored in video random access memory 6 via the image system bus. Data corresponding to this image is recalled from video random access memory 6 and supplied to video palette 7. Video palette 7 may transform this recalled data into another color space, expand the number of bits per pixel and the like. This conversion may be accomplished through a look-up table. Video palette 7 also generates the proper video signals to drive video display 8. If these video signals are analog signals, then video palette 7 includes suitable digital to analog conversion. The video level signal output from the video palette 7 may include color, saturation, and brightness information. Multiprocessor integrated circuit 100 controls data stored within the video palette 7, thus controlling the data transformation process and the timing of image frames. Multiprocessor integrated circuit 100 can control the line length and the number of lines per frame of the video display image, the synchronization, retrace, and blanking signals through control of video palette 7. Significantly, multiprocessor integrated circuit 100 determines and controls where graphic display information is stored in the video random access memory 6. Subsequently, during readout from the video random access memory 6, multiprocessor integrated circuit 100 determines the readout sequence from the video random access memory 6, the addresses to be accessed, and control information needed to produce the desired graphic image on video display 8.

Video display 8 produces the specified video display for viewing by the user. There are two widely used techniques. The first technique specifies video data in terms of color, hue, brightness, and saturation for each pixel. For the second technique, color levels of red, blue and green are specified for each pixel. Video palette 7 the video display 8 is designed and fabricated to be compatible with the selected technique.

FIG. 1 illustrates an additional memory 9 coupled to the image system bus. This additional memory may include additional video random access memory, dynamic random access memory, static random access memory or read only memory. Multiprocessor integrated circuit 100 may be controlled either in wholly or partially by a program stored in the memory 9. This memory 9 may also store various types of graphic image data. In addition, multiprocessor integrated circuit 100 preferably includes memory interface circuits for video random access memory, dynamic random access memory and static random access memory. Thus a system could be constructed using multiprocessor integrated circuit 100 without any video random access memory 5 or 6.

FIG. 1 illustrates transceiver 16. Transceiver 16 provides translation and bidirectional communication between the image system bus and a communications channel. One example of a system employing transceiver 16 is video conferencing. The image data processing system illustrated in FIG. 1 employs imaging device 3 and image capture controller 4 to form a video image of persons at a first location. Multiprocessor integrated circuit 100 provides video compression and transmits the compressed video signal to a similar image data processing system at another location via transceiver 16 and the communications channel. Transceiver 16 receives a similarly compressed video signal from the remote image data processing system via the communications channel. Multiprocessor integrated circuit 100 decompresses this received signal and controls video random access memory 6 and video palette 7 to display the corresponding decompressed video signal on video display 8. Note this is not the only example where the image data processing system employs transceiver 16. Also note that the bidirectional communications need not be the same type signals. For example, in an interactive cable television signal the cable system head in would transmit compressed video signals to the image data processing system via the communications channel. The image data processing system could transmit control and data signals back to the cable system head in via transceiver 16 and the communications channel.

FIG. 1 illustrates memory cache service unit 17. Memory configuration cache service unit 17 responses to memory configuration cycles generated by multiprocessor integrated circuit 100 in a manner which will be more completely described below. In the preferred embodiment memory configuration cache service unit 17 is an application specific integrated circuit designed for the particular image system. Memory configuration cache service unit 17 stores the address range and the memory access parameters for each different memory bank type and for each memory-mapped peripheral type in the particular image system.

FIG. 1 illustrates multiprocessor integrated circuit 100 embodied in a system including host processing system 1. Those skilled in the art would realize from the disclosure the preferred embodiments of the invention that multiprocessor integrated circuit 100 may also be employed as the only processor of a useful system. In such a system multiprocessor integrated circuit 100 is programmed to perform all the functions of the system.

This multiprocessor integrated circuit 100 is particularly useful in systems used for image processing. Multiprocessor integrated circuit 100 preferably includes plural identical processors. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

Figure 2:
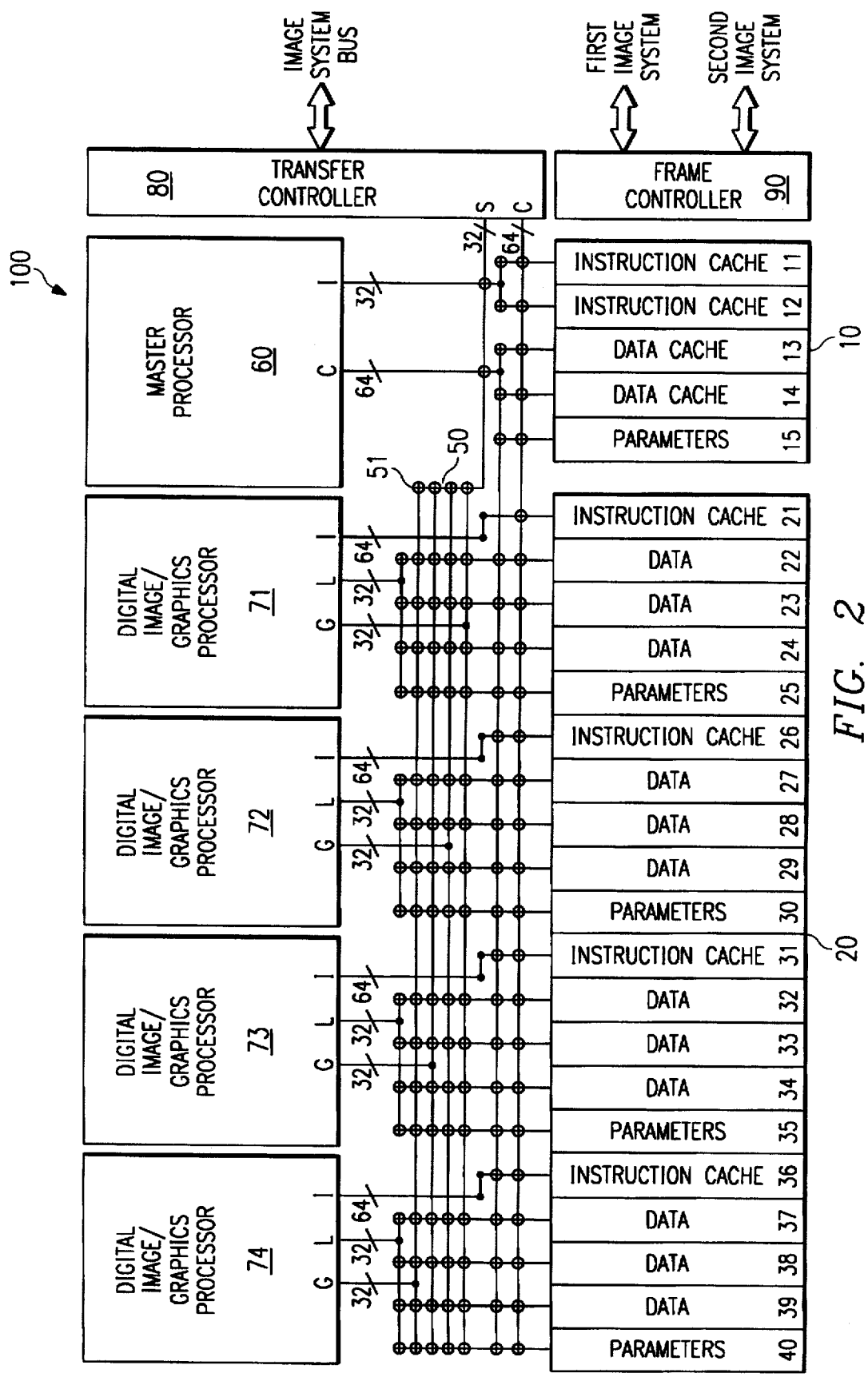
FIG. 2 illustrates the architecture of a single integrated circuit multiprocessor.

FIG. 2 illustrates the architecture of the multiprocessor integrated circuit 100. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multimedia computing. Since there are computing applications other than image and graphics processing where these processors will be useful, reference to processors 71, 72, 73 and 74 as image/graphics processors is for convenience only.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 includes 2K bytes for example, with a total memory within multiprocessor integrated circuit 100 of 50K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit data words from the corresponding instruction cache. A local data port (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories or random access memory 20. Master Processor 60 includes two memory ports. An instruction port (I) may fetch a 32 bit instruction word from either of the instruction caches 11 and 12. A data port (C) may read a 32 bit data word from or write a 32 bit data word into data caches 13 or 14, parameter memory 15 of random access memory 10 or any of the data memories, the parameter memories of random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2K bytes of memory, there is 4K bytes of instruction cache and 4K bytes of data cache. Cache control is an integral function of master processor 60. As previously mentioned, master processor 60 may also access other memory sections via crossbar 50.

The four digital image/graphics processors 71, 72, 73 and 74 each have a highly parallel digital signal processor (DSP) architecture. Digital image/graphics processors 71, 72, 73 and 74 achieve a high degree of parallelism of operation employing three separate units: a data unit; an address unit; and a program flow control unit. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be independent or cooperative. In the latter case crossbar 50 enables inter-processor communication in combination with the shared memory. Digital image/graphics processors 71, 72, 73 and 74 may also operate in a synchronized MIMD mode. In the synchronized MIMD mode, the program control flow unit 130 of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently queues, sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/graphics processors 71, 72, 73 and 74 may request data transfers from transfer controller 80 as linked list packet transfers. These linked list packet transfers allow multidimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controlled 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width in this embodiment. This permits architecture flexibility by accommodating the addition or removal of digital image/graphics processors and corresponding memory modularly while maintaining the same pin out.

In one embodiment all parts of multiprocessor integrated circuit 100 are disposed on a single integrated circuit, which is formed in complementary metal oxide semiconductor (CMOS) using feature sizes of 0.6 µm. Multiprocessor integrated circuit 100 is suitably constructed in a pin grid array package having 256 pins. The inputs and outputs are compatible with transistor-transistor logic (TTL) logic voltages for example. Multiprocessor integrated circuit 100 includes about 3 million logic transistors and employs a clock rate of 50 MHz.

Multiprocessor integrated circuit 100 can operate in either little endian or big endian data formats. Unless otherwise noted, figures and tables represent operation in big endian format. Bit numbering for internal registers and the external data bus will always follow little endian convention with bit 0 on the right. Bytes within 64 bit double words are addressed from the right in little endian mode and from the left in big endian mode. Confusion can be avoided by always accessing internal registers using 32 bit operations. In other embodiments, wider or narrower bus widths are contemplated. Bus widths that are integral multiples of 16 bits are believed quite useful.

Transfer controller 80 provides the interface between master processor 60 and digital image/graphic processors 71, 72, 73 and 74 of multiprocessor integrated circuit 100 and external memory such as video RAM's 5 and 6 and memory 9. Transfer controller 80 performs some autonomous memory operations as well as memory operations requested by the processors. These will be described below. Transfer controller 80 has a 64 bit bus connection to crossbar 50 that provides access to all memories 11, 12, 13, 14, 15, 21, 22, 23, 24, 25, 26, 27, 28, 29, 30, 31, 32, 33, 34, 35, 36, 37, 38, 39 and 40. Thus transfer controller 80 may access all the instruction caches, data memories and parameter memories. A second 64 bit bus connects to the image system bus and provides off-chip access.

Transfer controller 80 permits an external host to gain access to the external memory via the image systems bus through the use of its hold/hold-acknowledge mechanism. Transfer controller 80 services cache misses and packet transfer requests, performs refresh of external DRAMs/VRAMs and performs the serial register transfer cycles required by the frame controller 90 to update VRAM based display/capture buffers. Transfer controller 80 memory operations involving memories 22, 23, 24, 27, 28, 29, 32, 33, 34, 37, 38 and 39 usually occur in response to packet transfer requests from digital image/graphics processors 71, 72, 73 and 74 or master processor 60. Packet transfers provide an extremely flexible method of transferring data between on-chip and/or off-chip memory. Transfer controller 80 may also provide data directly to the processors using direct external access (DEA) cycles. A direct external access cycle allows digital image/graphics processors 71, 72, 73 and 74 to access off-chip memory and allows master processor 60 to by-pass its data cache memories 12 and 13 when accessing external memory. Transfer controller 80 prioritizes the various requests and, when necessary, time-shares the external memory interface between packet transfer requests. All requests from the master processor 60, digital image/graphics processors 71, 72, 73 and 74, frame controller 90 and host processing system 1 are evaluated by transfer controller 80 and then serviced based on a fixed prioritization scheme. When multiple requests of the same priority are pending, transfer controller 80 services them on a round robin basis.

Transfer controller 80 must handle many different types of requests from the processors. In order to assure optimal system performance, these requests are prioritized by their urgency and importance. Because transfer controller 80 operates at these different priorities, its own priority on crossbar 50 can vary from cycle to cycle.

Figure 3:
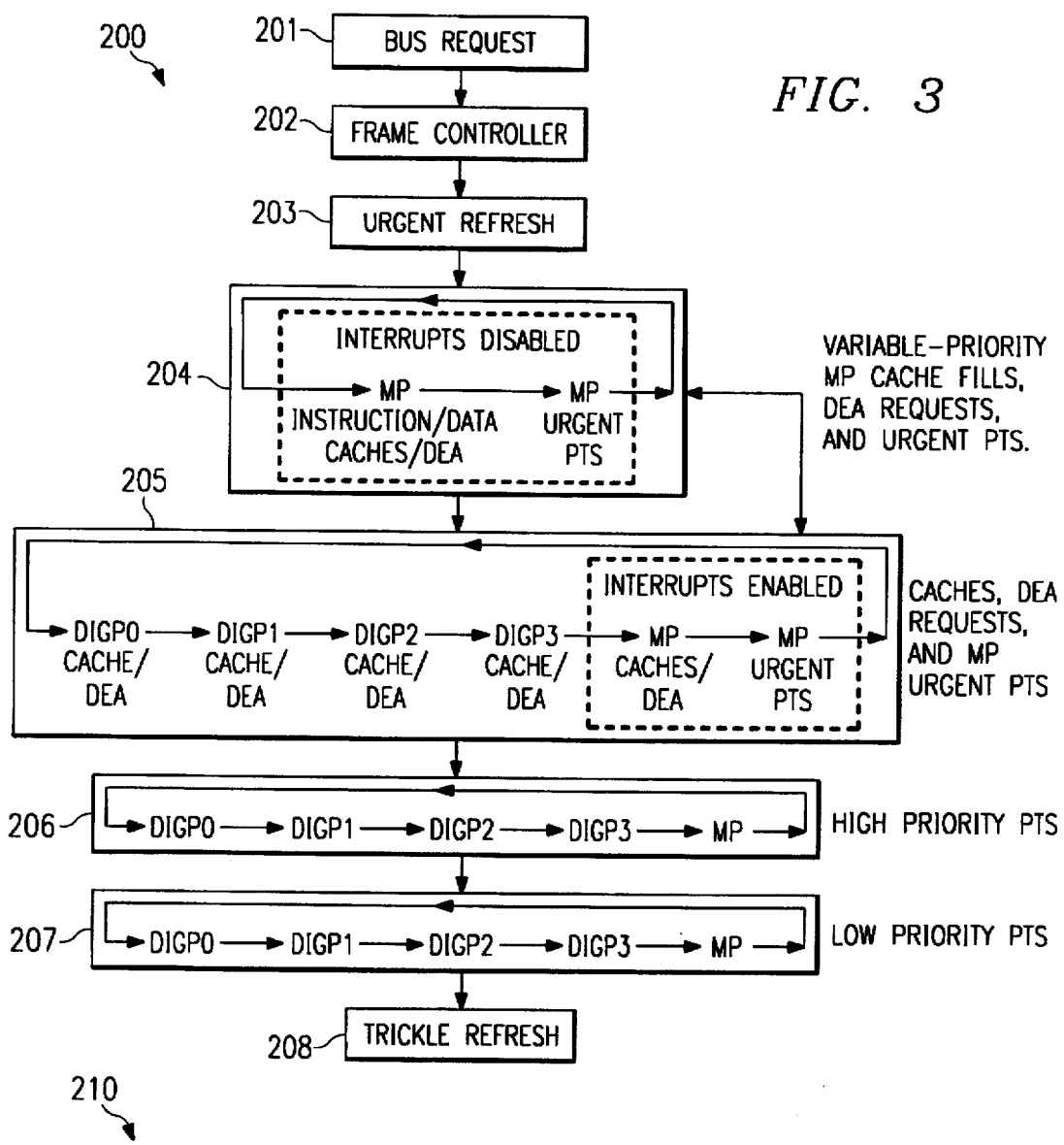
FIG. 3 illustrates image system bus priorities and method of operation.

FIG. 3 illustrates the priority of operation of transfer controller 80 on the image system bus. This is shown as a hierarchy 200. When multiple requests are received with the same priority, transfer controller 80 will round robin between them. This is shown in FIG. 3. Note that any processor can have only one active priority for its packet transfer. Digital image/graphics processors 71, 72, 73 and 74 are restricted to high and low priority packet transfers, while master processor 60 may submit a packet transfer request of urgent, high and low priority.

Top priority 201 is service of external bus request by host processing system 1 (HREQ). Transfer processor 80 is responsive to a signal on a host request line to surrender control of the image system bus to host processing system 1.

The next lower priority 202 is service of memory requests from frame controller 90. The next lower priority 203 is service of urgent dynamic random access memory (DRAM) refresh requests. As described further below, these urgent DRAM refresh requests occur when a predetermined backlog of DRAM refresh requests form.

The next priority 204 is service of master processor 60 instruction cache memories 11 and 12, data cache memories 12 and 13 and urgent packet transfer requests of master processor 60 when interrupts are disabled. All operations of transfer controller 80 involving the caches are requested automatically by the associated cache logic contained within each processor. The requested data is moved from its external memory location to the appropriate sub-block in the data cache memory of the requesting processor. Transfer controller 80 also saves the dirty sub-blocks of data cache memories 13 and 14 for master processor 60 when required by master processor 60. The urgent packet transfer request may only be requested by master processor 60 and includes setting a particular bit within the packet transfer request. This will be further described below. Note that these data transfers have a lower priority if master processor 60 has interrupts enabled.

The next lower level of priority involves service of instruction cache requests or direct external access (DEA) request of digital image/graphics processors 71, 72, 73 and 74 or master processor 60 instruction cache memories 11 and 12, data cache memories 12 and 13 and urgent packet transfer requests of master processor 60 when interrupts are enabled. Note that simultaneous access requests at this level are handled on a round robin basis depending on the requesting processor. A cache service request and a direct external access request for the same processor are serviced before passing the token to the next processor.

The next level of priority 206 is high priority packet transfers. As illustrated in FIG. 3, the packet transfers originating from the various processors are handled in a round robin fashion. Master processor 60 or one of the digital image/graphics processors 71, 72, 73 or 74 would ordinarily employ a high priority packet transfer if that processor is waiting for the requested data. Transfer controller 80 employs a similar round robin for low priority packet transfers, which form the next level of priority 207. Master processor 60 or one of the digital image/graphics processors 71, 72, 73 or 74 would ordinarily employ a low priority packet transfer if that processor is not waiting for the requested data. As will be further described below, the requesting processor indicates whether the packet transfer is to be urgent, high or low priority.

The rationale for the priority of each request is explained below. An external device, such as a host processing system 1, should be able to gain immediate access if it wishes. The external device can yield the image system bus back to transfer controller 80 for high priority requests if required by monitoring the REQ pin as explained further below. Frame controller 90 requests receive the second highest priority so that time critical VRAM transfer cycles can occur without disruption to video display or capture. Since host request cycles and frame controller 90 requests occur only intermittently, urgent DRAM refreshes, which require high priority, are prioritized below them. The next priority level is for master processor 60 cache service, direct external access and urgent priority packet transfer cycles that occur when master processor 60's interrupts are disabled. This allows master processor 60 interrupt service routines (which normally disable interrupts) to be performed as quickly as possible to maximize system performance. Digital image/graphics processors 71, 72, 73 and 74 cache service and direct external access requests are next in priority. It is important that these be serviced quickly since the processor is idle until the request is serviced. Master processor 60 cache service, and direct external access requests and urgent packet transfers are also at this priority if interrupts are enabled, since master processor 60 is not servicing an interrupt request from elsewhere in the system. High priority packet transfers imply that the requesting processor is waiting for data to finish transferring or that transfer controller 80 needs to take priority over the digital image/graphics processors 71, 72, 73 and 74 for crossbar access in order to optimize external bus bandwidth. Low priority packet transfers imply that the processor is not waiting for the data so they are given a very low priority. The lowest priority in the contemplated embodiment is given to trickle refresh cycles. These are only performed when the external bus is idle and the refresh backlog is non-zero. This helps lower the backlog and reduce the likelihood of a high priority urgent refresh being requested at a later time.

Whenever transfer controller 80 receives multiple requests from different processors of the same priority, it will form a round robin between them. The round robin is a fixed cyclical priority scheme. This means that no processor may be removed from the round robin nor may the order of the processors within the cycle be changed. When a request of a particular processor is completed, the round robin token will always be passed to the next processor with a pending request in the chain. This prevents any one processor from monopolizing transfer controller 80 when requests of equal priority from other processors need to be serviced.

Figure 4:
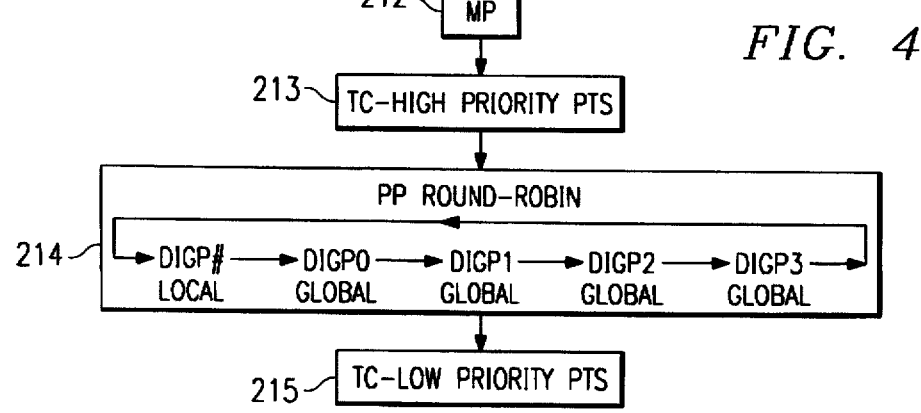
FIG. 4 illustrates crossbar priorities and method of operation within the multiprocessor integrated circuit.

The crossbar priority of transfer controller 80 changes dynamically according to the level of request that transfer controller 80 is servicing. This is shown in hierarchy 210 illustrated in FIG. 4. Transfer controller 80 is assigned priority as follows. Transfer controller 80 operates with a priority 211 above master processor 60 priority 212 when servicing an urgent priority packet transfer request, a cache service request, a direct external access request, or when flushing its pipeline. Transfer controller 80 flushes its pipeline whenever it receives an urgent DRAM refresh request, a request from frame controller 90, host interface request or a soft reset. These may not begin with external cycles waiting to be completed. Pipeline flushing only occurs occasionally and only locks out master processor 60 for a short period of time.

Transfer controller 80 is given a priority 213 above the priority 214 of digital image/graphics processors 71, 72, 73 and 74 but below master processor 60 for high priority packet transfers. This gives transfer controller 80 maximum possible priority without locking out master processor 60. Since master processor 60 will generally be used as the controller, locking it out for prolonged periods could have undesirable system implications.

Transfer controller 80 has priority 214 that is below the priority 214 of digital image/graphics processors 71, 72, 73 and 74 round robin if it is performing a low priority packet transfer. This prevents transfer controller 80 from stealing crossbar bandwidth from digital image/graphics processors 71, 72, 73 and 74 when the packet transfer has a low priority. Note local memory accesses of digital image/graphics processors 71, 72, 73 and 74 are directed to different memories and cannot interfere. Thus these local memory accesses have the same stage in the round robin.

Whenever a higher priority request is received by transfer controller 80, it will complete or suspend its current operations at the crossbar priority of the new request. This ensures that no blockages occur in the system. Thus, for example, a low priority packet transfer suspension will occur at the high priority level when a high priority packet transfer request is received.

Transfer controller 80 automatically services digital image/graphics processors 71, 72, 73 and 74 instruction cache misses and master processor 60 instruction and data cache misses. When multiple cache service requests are received, transfer controller 80 prioritizes them on a round robin basis as shown in FIG. 3. Transfer controller 80 signals the requesting processor when its cache miss has been serviced. Master processor 60 may have both its instruction and data caches serviced within its turn on the round robin.

The instruction caches of digital image/graphics processors 71, 72, 73 and 74 are one-way set associative (fully associative) caches consisting of 4 blocks each with 4 128-byte (16-instruction) sub-blocks. Multiple-way set associative caches are contemplated in other embodiments. When a digital image/graphics processor experiences a cache miss, its program flow control unit will signal transfer controller 80, requesting a cache miss service. The digital image/graphics processors 71, 72, 73 or 74 determines the cache block in which the instructions should be placed and passes this information as well as the address to transfer controller 80. Transfer controller 80 will then fetch a complete sub-block (128 bytes) from external memory and place it in the appropriate cache sub-block of the requesting digital image/graphics processor 71, 72, 73 or 74. Transfer controller 80 then informs digital image/graphics processor 71, 72, 73 or 74 that the request has been serviced so that the processor can continue executing its program.

Master processor 60 caches are four-way set associative with each set consisting of 4 blocks. Each block contains 4 64-byte sub-blocks. Master processor 60 may request service on it's instruction cache or data cache or both. Master processor 60 instruction cache service request is handled identically to digital image/graphics processors 71, 72, 73 and 74 cache request except that the size of the sub-block fetched by transfer controller 80 is only 64 bytes.

Data cache memories 13 and 14 of master processor 60 are different from instruction caches 11 and 12 in that transfer controller 80 may be requested to write the contents back to external memory. For master processor 60 data cache misses, transfer controller 80 fetches a 64 byte sub-block as with master processor 60 instruction cache. If, however, master processor 60 experienced a block miss because no matching tag address is found and all blocks have been used, it will first request transfer controller 80 to write back any dirty sub-blocks in the "least recently used" block before that block is replaced. Dirty sub-block write backs can all take place within a single master processor 60 "turn" in the round robin priority. Transfer controller 80 may also be requested to write back a dirty sub-block in response to special cache instruction.

Transfer controller 80 is responsible for handling all direct external access (DEA) requests from master processor 60 and digital image/graphics processors 71, 72, 73 and 74. Direct external access cycles allow digital image/graphics processors 71, 72, 73 and 74 to access data in external memory directly and allow the master processor 60 to by-pass its data cache. Since direct external access accesses are given a high priority, they are limited to a single access which may be a byte, half-word (16 bits), word (32 bits), or double-word (64 bits) in length. This prevents a single processor from monopolizing the external bus with multiple direct external access cycles, which would prevent the direct external access request and cache misses of other processors from being serviced. Direct external access cycles are meant to be used when fast access to a single off-chip memory location, such as a program variable or off-chip register, is needed.

Digital image/graphics processors 71, 72, 73 and 74 may access their parameter memories 25, 30, 35 and 40, and their data memories 22, 23, 24, 26, 28, 29, 32, 33, 34, 37, 38 and 39 normally. Accesses to addresses of Hex "02000000" and above automatically cause a direct external access request to be sent to transfer controller 80. The request will be serviced when the requesting digital image/graphics processors 71, 72, 73 and 74 turn in the cache/direct external access round robin is reached. Both a cache-miss and direct external access request may be serviced in a single turn if both requests are pending. A digital image/graphics processor 71, 72, 73 or 74 access to an on-chip memory area not accessible via the crossbar such as master processor 60 parameter memory 15 will be converted to a direct external access request to transfer controller 80. That direct external access, however, will result in a fault. Digital image/graphics processors 71, 72, 73 and 74 direct external access cycles that cause a fault to occur are handled identically to faulted digital image/graphics processors 71, 72, 73 and 74 cache cycles.

Master processor 60 uses direct external access cycles in a slightly different manner than digital image/graphics processors 71, 72, 73 and 74. Master processor 60 normally accesses external memory through data cache memories 13 and 14. Master processor 60 uses direct external access cycles to by-pass data cache memories 13 and 14 and access memory directly. Direct external access cycles are specified explicitly using special memory load or store instructions. If master processor 60 attempts to perform such a special load or store instruction to an on-chip address that is not accessible to master processor 60 (such as a digital image/graphics processors 71, 72, 73 and 74 instruction cache memories 21, 26, 31 and 36) the operation will be converted into a direct external access request which will then be faulted by transfer controller 80. A special memory load or store operation to an accessible on-chip memory area such as the on-chip registers or a digital image/graphics processors 71, 72, 73 and 74 data memories 22, 23, 24, 27, 28, 29, 32, 33, 34, 37, 38 and 39) will be converted to a normal load or store operation and no direct external access request will occur via transfer controller 80.

Figure 5:
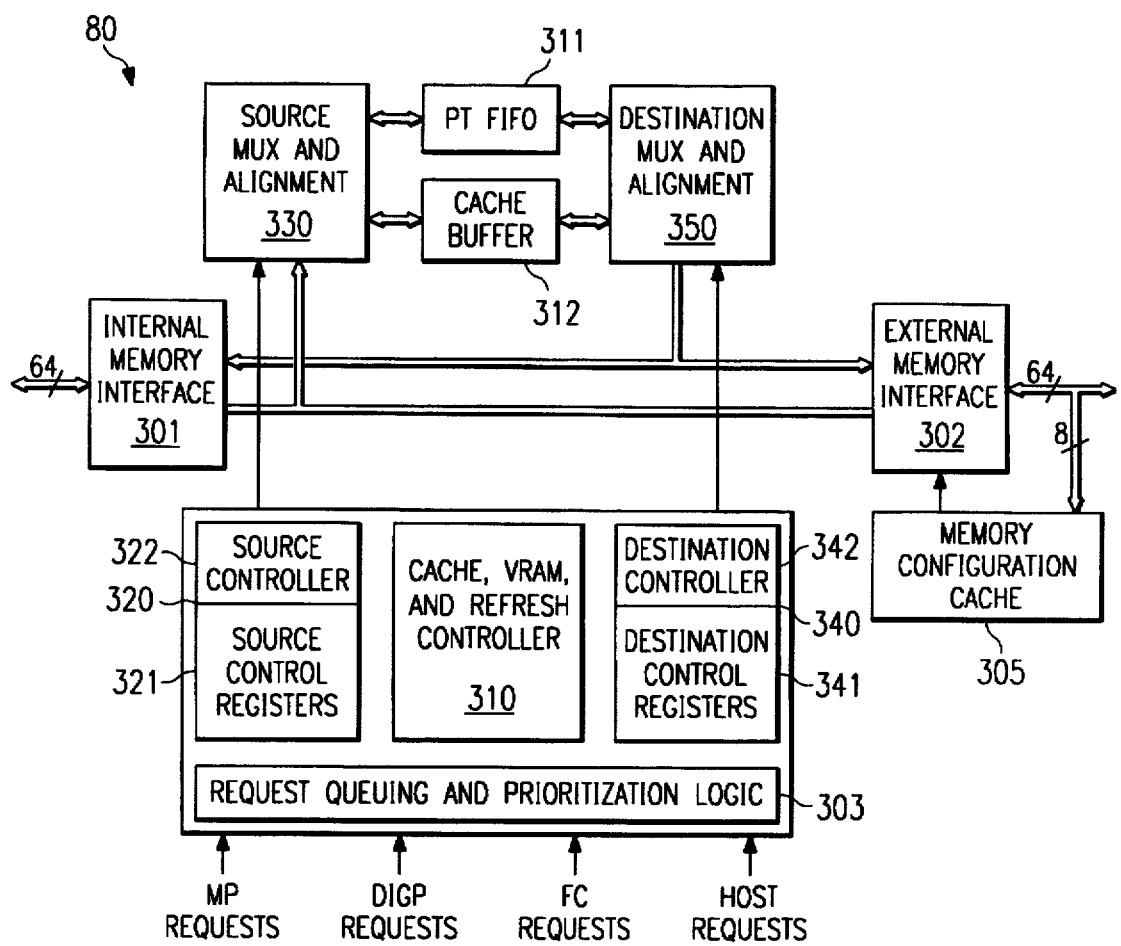
FIG. 5 illustrates the transfer processor structure of an inventive embodiment.

FIG. 5 illustrates a high-level block diagram of transfer controller 80. A brief description of each major block is given below. Transfer controller 80 includes: internal memory interface 301; external memory interface 302; request queuing and prioritization circuit 303; memory configuration cache 305; cache, VRAM and refresh controller 310; packet transfer first-in-first-out (FIFO) buffer 311; cache buffer 312; source machine 320 consisting of source registers 321 and source control logic 322; source multiplexer and alignment logic 330; destination machine 340 consisting of destination registers 341 and destination control logic 342; and destination multiplexer and alignment logic 350.

Transfer controller 80 is responsible for all accesses to external memory by multiprocessor integrated circuit 100. The external memory interface is designed to accommodate many different types and sizes of memory devices and peripherals. The type of memory being accessed is dynamically determined, allowing the timing of each memory cycle to be optimized for the device being accessed.

In order for transfer controller 80 to properly communicate with external memory, it must know what type of memory it is accessing. It is contemplated that multiprocessor integrated circuit 100 will be coupled to a variety of external memory types. Additionally, it is contemplated that any particular system using multiprocessor integrated circuit 100 will include more than one memory type. This invention is a new kind of adaptable memory interface which overcomes the disadvantages of the prior art cited above. This is accomplished using memory configuration cache 305. Memory configuration cache 305 stores plural memory configuration cache entries. Each memory configuration cache entry includes an indication of an address range, a set of memory configuration parameters to be used for memory access and a valid bit.

For each external memory access, the generated external memory address is compared to the address range of each valid entry in memory configuration cache 305. Note that following reset, such as upon initial application of electrical power, all the valid bits will be cleared. Thus the first external memory access will not match any of the cache entries. If the external memory access matches any of the cache entries, then the corresponding set of memory access parameters are used for the current external memory access. If the external memory address does not match any of the cache entries, then the memory access parameters are not stored in the memory configuration cache. New memory access parameters must be requested from an external source. The memory access parameters are input to the multiprocessor integrated circuit 100 via a special configuration memory cycle. If there are no unused cache entry spaces, then this newly received memory configuration cache entry replaces a prior stored memory configuration cache entry. The external access then proceeds, using the newly received memory access parameters stored in the new cache entry. The number of cache entries, and the manner in which they are discarded are not important to the basic invention.

The memory configuration cycle must be distinguishable externally from a normal memory access, so that the external hardware responsible for determining the configuration can respond. The memory configuration cycle outputs the address the processor is trying to access, and external hardware returns the memory configuration appropriate to that address on the processor's data bus. As memory configuration cycles should occur relatively infrequently, it is acceptable for them to be quite slow. Therefore, in the preferred embodiment memory configuration cycles are implemented in a way to minimize system cost. As an example, the memory configuration data is transmitted via fewer bits, such as 8 bits, than the entire data bus.

The following is a list of multiprocessor integrated circuit 100 signals used for external data access via external memory interface 302.

Address/data bus AD[63:0]. This is a multiplexed address and data bus. During a data cycle, which occurs during the column address time, address/data bus AD provides the capability for sending and receiving up to a 64 bit data word. The bus may be configured to access less than 64 bits. During an address cycle, which occurs at the row address time, address/data bus AD[31:0] supplies a 32 memory address. This address is used in conjunction with row/column address bus RCA[16:0] for supplying the column address which DRAM's require for access.

Output clock CLKOUT. This clock output allows of external logic to synchronize to the operation of multiprocessor integrated circuit 100.

Column address strobes $\overline{C}$ $\overline{A}$ $\overline{S}$[7:0]. These outputs drive the $\overline{C}$ $\overline{A}$ $\overline{S}$ inputs of DRAMs/VRAMs. Eight strobes are provided to allow individual byte access. $\overline{C}$ $\overline{A}$ $\overline{S}$[0] corresponds to the transfer of data on D[7:0], $\overline{C}$ $\overline{A}$ $\overline{S}$[1] to a transfer on D[15:8], etc. regardless of the endian mode. In transparency, these signals are used as byte write strobes.

Data buffer output enable $\overline{D}$ $\overline{B}$ $\overline{E}$ $\overline{N}$. This output can be used to turn on data transceivers.

Data direction indicator $\overline{D}$ $\overline{D}$ $\overline{I}$ $\overline{N}$. This output provides direction indicator to data transceivers.

Special function pin DSF. This output is used to select special VRAM functions.

Memory exception $\overline{E}$ $\overline{X}$ $\overline{C}$ $\overline{E}$ $\overline{P}$ $\overline{T}$[1:0]. The memory exception $\overline{E}$ $\overline{X}$ $\overline{C}$ $\overline{E}$ $\overline{P}$ $\overline{T}$[1:0] signals indicate memory exceptions according to Table 1 below.

TABLE 1

| $\overline{EXCEPT}$ [1:0] | | Memory Exception |
|---|---|---|
| 0 | 0 | Cache Flush |
| 0 | 1 | Fault |
| 1 | 0 | Retry/Page Request |
| 1 | 1 | None |

Row address strobe $\overline{R}$ $\overline{A}$ $\overline{S}$. These outputs drive the $\overline{R}$ $\overline{A}$ $\overline{S}$ inputs of DRAMs/VRAMs.

Row/column address RCA[16:0]. Row/column address lines RCA[16:0] supply the row address during the row time and the column address during the column time. These external output lines can be used to directly access DRAM's which require multiplexed row and column addresses.

READY. This input indicates that the external device is ready for the memory cycle to be completed. This is used by transfer controller 80 to insert wait states into memory cycles.

Request REQ. This output from multiprocessor integrated circuit 100 indicates the current type of memory access. A "1" indicates an urgent refresh or external packet transfer. All other memory accesses are indicated by a "0". This output can be used by external hardware in conjunction with the host external bus request HREQ to prioritize bus control.

Row latch $\overline{R}$ $\overline{L}$. This output indicates that a valid 32 bit address is present on the address bus.

Transfer/output enable $\overline{T}$ $\overline{R}$. This output from transfer controller 80 enables DRAM output drivers and VRAM shift register transfer cycles.

Write enable $\overline{W}$ $\overline{E}$. This is normally an output which indicates to memory that a write or write transfer cycle is occurring. In the internal memory test mode this is an input driven by an external device to write to internal memory.

Figure 6:
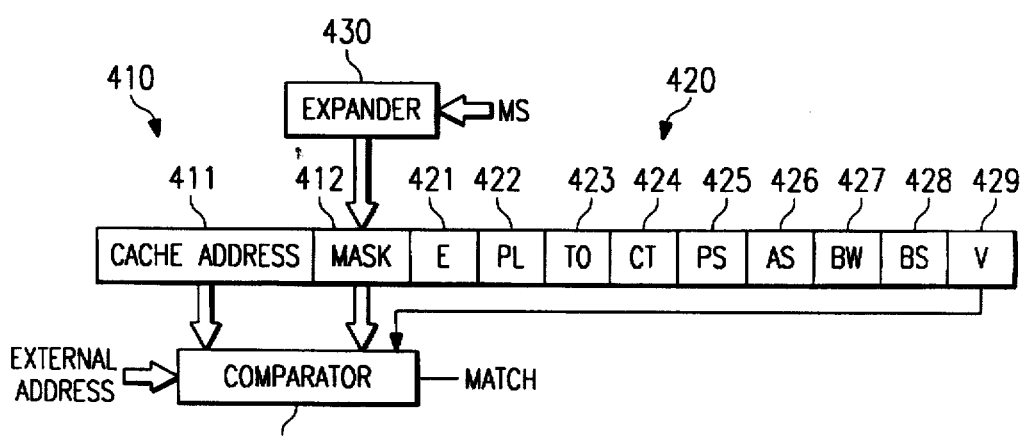
FIG. 6 illustrates the circuits associated with a single memory configuration cache entry.

FIG. 6 illustrates further detail of the memory configuration cache 305. FIG. 6 illustrates the circuits related to a single cache entry. In the preferred embodiment memory configuration cache 305 includes six such cache entries. Each cache entry includes an address range section 410 specifying the address range and a memory access parameters section 420 specifying the memory access parameters to be used in the memory access. In the preferred embodiment the address range section consists of a cache address 411 and a mask 412. The cache address 411 comes from the generated external address which triggered the memory configuration cycle. The mask 412 designates a set of most significant bits of address employed with the corresponding address 411 for match purposes. This mask 412 is derived from an input field memory bank size MS[4:0] received from an external source upon a memory configuration cycle. The five bits of the memory bank size MS[4:0] are expanded to a 32 bit mask as shown in Table 2 below.

TABLE 2

| MS[4:0] | Mask | | | | Address Bits Compared |
|---|---|---|---|---|---|
| 00000 | 00000000 | 00000000 | 00000000 | 00000000 | None |
| 00001 | 10000000 | 00000000 | 00000000 | 00000000 | 31 |
| 00010 | 11000000 | 00000000 | 00000000 | 00000000 | 31:30 |
| 00011 | 11100000 | 00000000 | 00000000 | 00000000 | 31:29 |
| 00100 | 11110000 | 00000000 | 00000000 | 00000000 | 31:28 |
| 00101 | 11111000 | 00000000 | 00000000 | 00000000 | 31:27 |
| 00110 | 11111100 | 00000000 | 00000000 | 00000000 | 31:26 |
| 00111 | 11111110 | 00000000 | 00000000 | 00000000 | 31:25 |
| 01000 | 11111111 | 00000000 | 00000000 | 00000000 | 31:24 |
| 01001 | 11111111 | 10000000 | 00000000 | 00000000 | 31:23 |
| 01010 | 11111111 | 11000000 | 00000000 | 00000000 | 31:22 |
| 01011 | 11111111 | 11100000 | 00000000 | 00000000 | 31:21 |
| 01100 | 11111111 | 11110000 | 00000000 | 00000000 | 31:20 |
| 01101 | 11111111 | 11111000 | 00000000 | 00000000 | 31:19 |
| 01110 | 11111111 | 11111100 | 00000000 | 00000000 | 31:18 |
| 01111 | 11111111 | 11111110 | 00000000 | 00000000 | 31:17 |
| 10000 | 11111111 | 11111111 | 00000000 | 00000000 | 31:16 |
| 10001 | 11111111 | 11111111 | 10000000 | 00000000 | 31:15 |
| 10010 | 11111111 | 11111111 | 11000000 | 00000000 | 31:14 |
| 10011 | 11111111 | 11111111 | 11100000 | 00000000 | 31:13 |
| 10100 | 11111111 | 11111111 | 11110000 | 00000000 | 31:12 |
| 10101 | 11111111 | 11111111 | 11111000 | 00000000 | 31:11 |
| 10110 | 11111111 | 11111111 | 11111100 | 00000000 | 31:10 |
| 10111 | 11111111 | 11111111 | 11111110 | 00000000 | 31:9 |
| 11000 | 11111111 | 11111111 | 11111111 | 00000000 | 31:8 |
| 11001 | 11111111 | 11111111 | 11111111 | 10000000 | 31:7 |
| 11010 | 11111111 | 11111111 | 11111111 | 11000000 | 31:6 |
| 11011 | 11111111 | 11111111 | 11111111 | 11100000 | 31:5 |
| 11100 | 11111111 | 11111111 | 11111111 | 11110000 | 31:4 |
| 11101 | 11111111 | 11111111 | 11111111 | 11111000 | 31:3 |
| 11110 | 11111111 | 11111111 | 11111111 | 11111100 | 31:2 |
| 11111 | 11111111 | 11111111 | 11111111 | 11111110 | 31:1 |

The use of mask 412 will be further detailed below.

Upon each external memory access the external address is compared with the address range of each cache entry. In the preferred embodiment of this invention the address range is always a power of 2 and encompasses a number of least significant address bits. Therefore the address range can be completely specified using the original external memory address and the mask bits. Comparator 440 receives the external address of the proposed external memory access, cache address 411, mask 412 and valid bit 429. Comparator 440 generates a match output if the most significant bits designated by mask 412 of the external address and the cache address 411 are equal and valid bit 429 indicates a valid cache entry. FIG. 7 illustrates an example of one bit of comparator 440. The bit of the external address ADD$_i$ is exclusive ORed in XOR gate 441 with the corresponding bit of the cache address CAD$_i$. This output is "0" if the bits match and "1" if they don't match. The XOR 441 output is NANDed with the corresponding bit of the mask MASK$_i$ in NAND gate 443. If $MASK_i$ is "0" indicating a non-used bit, then the output of NAND gate 443 is "1". If $MASK_i$ is "1" indicating a used bit, then the output of NAND gate 442 is the inverse of the output of XOR gate 441. This output is thus "1" if $ADD_i$ and $CAD_i$ match and "0" if they don't match. All of the corresponding bit outputs are ANDed in 33 input AND gate 445. Also ANDed in AND gate 445 is the cache entry valid bit V. The output of AND gate 445 is "1" if the valid bit V is "1" and all of the $ADD_i$ and $CAD_i$ match or are masked by $MASK_i$. Otherwise the output of AND gate 445 is "0" indicating a non-match.

FIGS. 8 and 9 illustrate alternative embodiments of the cache entry. FIG. 8 is identical to FIG. 6 except that the mask bits MS[4:0] are expanded by expander 430 upon each comparison rather than storing the already expanded mask. FIG. 9 illustrates another method of indicating the address range. The address range is indicated by a top address 415 and a bottom address 416. These addresses are supplied by the external system during a memory configuration cycle. The A≦B comparator 442 receives the external address of the proposed external memory access on an A input and the top address 415 on a B input. The A≦B comparator 442 generates a valid output if the external address is less than or equal to the top address 415. Similarly, A≧B comparator 444 receives the external address on an A input and the bottom address 416 on a B input. The A≧B comparator 444 generates a valid output if the external address is greater than or equal to the bottom address 416. The AND gate 446 generates the match signal if the external address is within the address range of top address 415 and bottom address 416. This alternative permits specification of arbitrary address ranges rather than the limitation to powers of 2 of the embodiment of FIG. 6.

As noted below there are 25 configuration bits which must be read during a memory configuration cycle. It is thus possible to supply the complete information in a single 32 bit data word. However, memory configuration cache service unit 17 will be used infrequently. Providing 32 bus drivers and 32 external data pins would be more expensive than necessary. In the preferred embodiment, memory configuration cache service unit 17 supplies the memory cache parameters in four 8 bit memory cycles. This requires only 8 bus drivers and 8 data output pins. FIG. 10 illustrates the organization of the four 8 bit words. The definition of the various fields will be further detailed below. As shown in FIG. 10, for little endian operation the data is supplied to AD[7:0] and for big endian operation the data is supplied to AD[63:56]. The timing of these memory configuration cache cycles is the same two cycles per column as asynchronous SRAM cycles allowing insertion of wait states if memory configuration cache service unit 17 is slower than multiprocessor integrated circuit 100. Memory configuration cache service unit 17 responds to RCA[1:0] to supply individual data words as illustrated in FIG. 10.

Memory configuration cache service unit 17 must include data on all the memory banks and the memory-mapped peripheral accesses contemplated in a particular system. In addition, memory configuration cache service unit 17 must respond to the supplied external address to transmit the corresponding memory access parameters to multiprocessor integrated circuit 100. It is contemplated that memory configuration cache service unit 17 will be an application specific integrated circuit configured for the particular system constructed.

Memory access parameters section 420 includes memory exception bit E 421, priority level bits PL[1:0] 422, extra turn-off cycle bits TO[1:0] 423, cycle timing bits CT[3:0] 424, page size bits PS[3:0] 425, address shift bits AS[2:0] 426, block write bits BW[1:0] 427, bus size bits BS[1:0] 428 and valid bit V 429. Each of these memory parameters controls a portion of the external memory access performed by transfer controller 80.

Memory exception bit E indicates whether transfer controller 80 should support memory exceptions. A particular type of memory bank may not require exception support. Support for memory exceptions slows down the memory access for faster memory types due to the requirement that the transfer controller wait until the external system has supplied the memory exception $\overline{EXCEPT}$[1:0] signals. Selectively providing memory exception support enables greater speed access to those memories that do not need memory exception support while enabling memory exception support for memories that require it. The memory exception bit E is encoded as shown below in Table 3.

TABLE 3

| E | Memory Exception |
|---|---|
| 0 | Not Supported |
| 1 | Supported |

The priority level bits PL[1:0] set the priority level of cache entry reuse. In the preferred embodiment the memory configuration cache 305 includes six cache entries. This is a compromise between the circuit area on multiprocessor integrated circuit 100 and the rate of cache misses. Any system employing multiprocessor integrated circuit 100 requiring more than six different types of memory access will generate a cache miss when memory configuration cache 305 is full. When this occurs one cache entry must be flushed and replaced by a new cache entry received during a memory configuration cycle. Caches generally flush and replace the cache entry least recently used. In the memory configuration cache of this invention, memory configuration cycles are expected to be lengthy but to occur infrequently. Thus little effective processing time will generally be lost during memory configuration cycles. Nevertheless, it would be beneficial to employ greater intelligence to ensure that cache entries expected to be used most often would not be replaced even if they are the least recently used. The priority level PL[1:0] is used in this regard. The priority level PL[1:0] is encoded as shown below in Table 4.

TABLE 4

| PL [1:0] | | Priority Level |
|---|---|---|
| 0 | 0 | Low |
| 0 | 1 | High |
| 1 | 0 | reserved |
| 1 | 1 | Locked |

When a cache entry must be flushed and replaced, the least recently used cache entry in the lowest priority present is selected. A low priority level cache entry will be discarded before a high priority level cache entry. Only if there are no low priority cache entries in memory configuration cache 305 will a high priority cache entry be replaced. The locked priority is the highest priority. A locked cache entry is never replaced except upon general reset. If a cache miss occurs when memory configuration cache 305 holds only locked cache entries a memory fault will occur. The locked priority level is intended only for time critical applications in which an infrequent memory configuration cycle may cause a break down. This priority hierarchy least recently used technique permit the designer to supply some intelligence to the cache entry replacement process.

Those skilled in the art would realize that the particular encoding of priority level PL[1:0] is merely a convenient design choice. The priority level could include two levels or more than three levels. A priority level technique including two levels would require only a single bit to indicate the priority level. A priority level technique including more than four levels would require more bits to indicate the priority level. Those skilled in the art would also realize that the locked level is not required to embody a multilevel priority least recently used replacement scheme. It is perfectly feasible to have cache entries of the highest level of priority replaceable in the same manner as cache entries of other priorities. In such a case, if all the cache entries are of the highest priority level, then the least recently used of these cache entries would be replaced upon a cache miss and no memory fault would be indicated.

The extra turn-off cycle bits TO[1:0] control the delay between the turn-off of the data transceiver following supply of the address during the row time of the address cycle and turning on the data transceivers for a data read. In the absence of external data transceivers, the normal turn-off delay may not be enough for some types of devices to prevent drive conflicts, particularly for EPROM's. The extra turn-off cycle bits TO[1:0] instructs transfer controller 80 to include additional cycles of turn-off time during reads and peripheral data transfer writes. The extra turn-off cycle bits TO[1:0] are encoded as shown below in Table 5.

TABLE 5

| TO [1:0] | | Extra Turn-Off Cycles |
|---|---|---|
| 0 | 0 | 0 |
| 0 | 1 | 1 |
| 1 | 0 | 2 |
| 1 | 1 | 3 |

The cycle timing bits CT[3:0] controls the cycle timing for various types of memory. The cycle timing bits CT[3:0] are encoded as shown below in Table 6.

TABLE 6

| CT [3:0] | | | | Cycle Timing |
|---|---|---|---|---|
| 0 | 0 | 0 | 0 | DRAM: Pipelined 1 cycle/column EDO |
| 0 | 0 | 0 | 1 | DRAM: Non-Pipelined 1 cycle/column EDO |
| 0 | 0 | 1 | 0 | DRAM: Non-Pipelined 2 cycles/column EDO |
| 0 | 0 | 1 | 1 | DRAM: Non-Pipelined 3 cycles/column EDO |
| 0 | 1 | 0 | 0 | SRAM: Synchronous 1 cycle/column |
| 0 | 1 | 0 | 1 | SRAM: Asynchronous 1 cycle/column |
| 0 | 1 | 1 | 0 | SRAM: Asynchronous 2 cycles/column |
| 0 | 1 | 1 | 1 | SRAM: Asynchronous 3 cycles/column |
| 1 | 0 | 0 | 0 | SDRAM: Burst length 1; read latency 2 |
| 1 | 0 | 0 | 1 | SDRAM: Burst length 1; read latency 3 |
| 1 | 0 | 1 | 0 | SDRAM: Burst length 1; read latency 4 |
| 1 | 0 | 1 | 1 | Reserved |
| 1 | 1 | 0 | 0 | SDRAM: Burst length 2; read latency 2 |
| 1 | 1 | 0 | 1 | SDRAM: Burst length 2; read latency 3 |
| 1 | 1 | 1 | 0 | SDRAM: Burst length 2; read latency 4 |
| 1 | 1 | 1 | 1 | Reserved |

In Table 6: DRAM means dynamic random access memory; EDO means extended data out; SRAM means static dynamic random access memory; and SDRAM means synchronous dynamic random access memory. Extended data out DRAM timing have symmetrical $\overline{C\,A\,S/D\,Q\,M}$ high and low times, with the read data sampled just before $\overline{C\,A\,S/D\,Q\,M}$ could go low next. The SRAM read timing are the same as DRAM timing, but read data is sampled on the same edge as $\overline{C\,A}$ $\overline{S/D\,Q\,M}$ are deactivated. The SRAM write timings are the same as DRAM timing, except that the write occurs one cycle earlier on the rising edge of $\overline{C\,A\,S/D\,Q\,M}$ rather than the falling edge. Special purpose VRAM cycles, such as serial register transfers, load color register cycles and block writes, are supported via DRAM and SDRAM timing. In addition non-EDO DRAM memories may also be supported by SRAM timings.

The block write bits BW[1:0] control VRAM block write modes. The block-write mode used by transfer controller 80 is selected by the value of the block write bits BW[1:0]. In the preferred embodiment block-write is supported only for a 64 bit data bus. Table 7 shows the block-write modes selected by BW[1:0].

TABLE 7

| BW [1:0] | | Block-Write Mode |
|---|---|---|
| 0 | 0 | Simulated |
| 0 | 1 | Reserved |
| 1 | 0 | 4x |
| 1 | 1 | 8x |

Because of various VRAM sizes and architectures, a number of different block-write methods exist. The following notation is used to express the various block-write methods: C×L×R; where C is the number of column locations per color register, L is the length of the color registers in bits, and R in the number of color registers. For example, most 1 Mbit VRAMs have a 256 Kbit×4 bit data array and support a 4×4×1 block-write. They have one 4 bit color register and each block-write cycle controls the writing of the color register to 4 adjacent column locations on each of the 4 memory array planes.

The 8× block-write mode is intended to be used with VRAMs that can write 8 column locations per access (i.e. 8×8×1 or 8×8×2 at 8 bits per location. Each bit of source data is output to one bit on the data bus D[63:0] and enables or disables writing of the 8 bit VRAM color register to one of the 64 columns accessed by the cycle. Each column represents a column location on each of the 8 memory array planes within each VRAM. Thus up to 64 bytes of color register data may be written in a single access.

Video RAMs that support 8× block-writes ignore the three least significant column addresses during block-write cycles. Thus since the data bus is 64 bits (8 bytes) wide, block-write cycles always begin on 64 byte boundaries. For destination addresses that are not 64-byte aligned, transfer controller 80 aligns the source bits and provides the "missing zeros" for the locations within the 64-byte access that are not being written to. Transfer controller 80 then remaps the bits so that they address the proper column locations within each of the VRAMs on the data bus.

Figure 11:
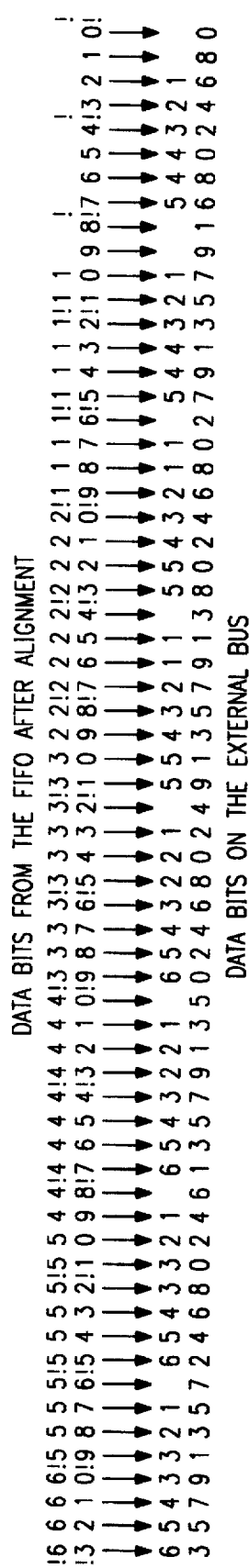
FIG. 11 illustrates an example of bit remapping in an 8× block-write bit remapping in little endian mode.

FIG. 11 shows a data remapping process for an 8× block-write in little endian mode. The first eight source bits control the first eight bytes of the destination. These bytes are actually the least significant column location in each of the eight 8-plane VRAM arrays being accessed. Since the least significant byte is controlled by the D0 inputs (D0 and D8 inputs for 16 bit VRAMs) of the VRAM during block-writes, source bits 0–7 get mapped to bits 0, 8, 16, 24, 32, 40, 48, and 56 of the data bus, respectively, which represent the D0 inputs (and D8 inputs for 16 bit devices) of the accessed VRAMs. The rest of the source bits are mapped in a similar manner. Transfer controller 80 makes a similar mapping for big endian 8× block-writes. Note that in big endian mode, the least significant bit of the source image is the left most bit and the most significant bit is the right most bit. Since the mapping mechanism is the same as used for little endian, source bits 0–7 are mapped to bits 63, 55, 47, 39, 31, 23, 15, and 7 respectively. These bits represent the least significant column locations being accessed in the VRAM arrays. Since these bytes are controlled by the D0 inputs (D0 and D8 inputs for 16 bit devices) of the VRAMs, the data bus must be connected to the VRAMs in reverse order for block-writes to work correctly.

Connecting the data bus in reverse order does not affect normal reads and writes since the data will be both written and read in reverse order. The user should recognize that the bits shifted out of or into the serial port of the VRAMs will also be in reverse order. This may require reversal of the serial data bus order when connecting to an output or input device, to assure proper operation.

The 4× block-write mode is designed for use with VRAMs that can write 4 column locations per access i.e. 4×4×1, 4×4×4, 4×8×1, 4×8×2 at either 4 or 8 bits per location. In the case of 4×4 block-writes, each bit of source data is output to two bits on the data bus D[63:0] and enables or disables the writing two of the 4 bit VRAM color registers to two of the 64 columns accessed by the cycle. Each column represents a column location on 4 planes of the array. Since each color register is only 4 bits wide, it takes two registers to represent an 8 bit pixel. Thus each source bit must control the two color registers which write to adjacent nibbles in order for an 8 bit write to occur. This allows up to 32 bytes of color register data to be written in a single access.

Video RAMs that support 4× block-writes ignore the two least significant column addresses during block-write cycles. Thus block-writes always begin on 32-byte boundaries. As with 8× block-writes, transfer controller 80 aligns the source data to the specified by the destination start address doubleword within the 32-byte block and fills in the "missing zeros" for double-words that are not being written.

Figure 12:
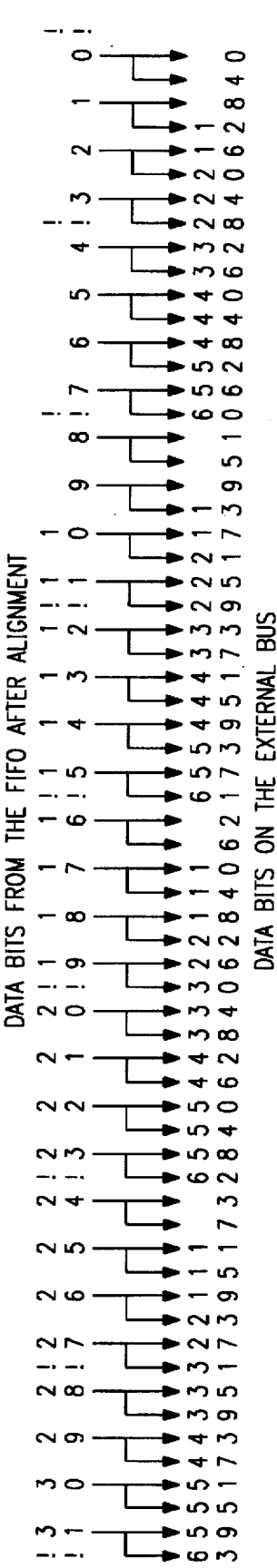
FIG. 12 illustrates an example of bit remapping in a 4× block-write bit remapping in little endian mode.

FIG. 12 shows a data remapping process for a 4× blockwrite in little endian mode. The first eight source bits control the first eight bytes of the destination. However, since in 4×4 block-writes each data input causes only four bits to be written, each source bit must be mapped to two data bus pins to cause a full byte to be written. Thus source bits 0–7 are mapped to bits 0 and 4, 8 and 12, 16 and 20, 24 and 28, 32 and 36, 40 and 44, 48 and 52, and 56 and 60, respectively.

In the case of 4×8×1 or 4×8×2 block-writes, the VRAM color registers are 8 bits wide. However, only four of the VRAM's 8 data inputs are used to select the bytes to be written. Thus half of the data bus is unused and only 32 bytes may be written in a single access. Note, however, that the data actually output on D[63:0] is identical; the VRAMs simply ignore every other nibble. In big endian mode, the source bits 0–7 are mapped to bits 63 and 59, 55 and 51, 47 and 43, 39 and 35, 31 and 27, 23 and 19, 15 and 11, and 7 and 3 of the external data bus respectively. As with 8× big endian block-write, the data bus must be connected to the VRAMs in reverse order to assure correct operation.

For memory devices which don't support block-write transfer controller 80 provides a simulated block-write mode. In this mode, the 64 bit color register value contained in the packet transfer parameters is output on the data bus and each source data bit functions as a byte select by controlling the $\overline{CAS}$ column address strobe pins to enable or disable one of the 8 bytes addressed during the cycle. Thus, block-writes are in essence converted to fill-with-value type transfers where the color register value becomes the fill value. The destination accesses then become normal, page-mode, 64 bit write cycles where writes to some bytes are disabled as specified by the source data.

Before 4× and 8× block-write cycles can be performed, the VRAMs' color registers must be loaded with the correct values. Transfer controller 80 does this by performing a load color register LCR cycle using the color register value contained in the packet transfer parameters. Since a block-write packet transfer can be interrupted by higher priority requests, such as a host access or another block-write packet transfer that may change the VRAM color registers, an load color register cycle must also be performed whenever a block-write packet transfer resumes. Thus a load color register cycle occurs whenever: a 4× or 8× block-write packet transfer begins; a block-write packet transfer resumes from suspension; or a block-write packet transfer continues after the host has used and returned the image system bus. A load color register cycle will not be performed if the memory being accessed requires simulated block-writes.

Once the color latches have been loaded, another load color register cycle will not be performed unless one of the above conditions occurs. If, for example, the block-write begins in 8× mode, and then alternates between simulated and 8× modes, the load color register will not be repeated each time the 8× mode is entered.

The sequence of events for block-write packet transfers is as follows. Transfer controller 80 outputs the load color register status code and address of the first block write to be performed. Next transfer controller 80 reads the block write bits BW[1:0]. If BW[1:0] equals "10" or "11", then the load color register cycle is completed using the 64 bit color register value contained in the packet transfer parameters. Following this 4× or 8× block-write cycles are generated to complete the packet transfer. On the other hand, if BW[1:0] equals "00", then the load color register cycle becomes a normal, page-mode write using the 64 bit color register value contained in the packet transfer parameters as data and the source data bits as byte selects. If a new row access is begun because of a page change or interruption from a higher priority cycle, then the step of outputting the load color register status code and the address of the next block write to be performed is repeated for the next destination address.

Once a load color register cycle has been performed, the sequence continues as follows. Transfer controller 80 outputs the block-write status code and the address of the next block-write to be performed. If BW[1:0]="10" or "11", then the block-write page-mode cycle is completed using the source data bits. If a new row access is begun, then the step of outputting the block-write status code and the address of the next block-write to be preformed is repeated. If, on the other hand, BW[1:0] equals "00", then the block-write cycle becomes a normal page-mode write using the 64 bit color register value contained in the packet transfer as data and the source data bits as byte selects. Again, if a new row access is begun, then the step of outputting the block-write status code and the address of the next block-write to be preformed is repeated for the next destination address.

Transfer controller 80 will always attempt to perform "real" 4× or 8× block writes. Thus the normal write cycles that occur during simulated block-write mode will always have either the load color register or block-write status codes.

The bus size bits BS[1:0] allow dynamic bus sizing for data buses less than 64 bits wide. The encoding of bus size bits BS[1:0] is shown below in Table 8.

TABLE 8

| BS [1:0] | | Bus Size |
|---|---|---|
| 0 | 0 | 8 bits |
| 0 | 1 | 16 bits |
| 1 | 0 | 32 bits |
| 1 | 1 | 64 bits |

The bus size bits BS[1:0] determine the bus size for the current access. Transfer controller 80 supports bus sizes of 8, 16, 32, or 64 bits as shown in Table 8. Setting the bus size determines the maximum number of bytes that transfer controller 80 can transfer during each column access. If the number of bytes requested exceeds the bus size, transfer controller 80 will automatically perform multiple accesses to complete the transfer. The selected bus size also determines which portion of the data bus will be used for the transfer. For 64 bit memory, the entire bus is available for transfers. For 32 bit memory, address/data bus AD[63:32] pins are used in big endian mode and address/data bus AD[31:0] pins are used in little endian mode. For 16 bit buses use address/data bus AD[63:48] pins and address/data bus AD[15:0] pins and 8 bit buses use data bus address/data bus AD[63:56] pins and address/data bus AD[7:0] pins for big and little endian, respectively. No matter what bus size is used, transfer controller 80 always aligns data to the proper portion of the bus and activates the appropriate $\overline{CAS}$ strobes to ensure that only valid bytes are transferred.

The valid bit V is used to indicate whether the corresponding cache entry is valid. Upon initial application of electrical power or following reset, all the valid bits are cleared. This indicates that all the cache entries are invalid. Thus transfer controller 80 provides a memory configuration cycle upon initial access to each different memory type. The valid bit V is also used to mark a cache entry due to be flushed and replaced during a memory configuration cycle. The valid bit V is encoded as shown below in Table 9.

TABLE 9

| V | Cache Entry Validity |
|---|---|
| 0 | Not Valid |
| 1 | Valid |

Since multiprocessor integrated circuit 100 supports DRAM as well as SRAM, it must provide multiplexed row and column addresses on its address bus. Multiprocessor integrated circuit 100 always outputs the full 32 bit byte address on address/data bus AD[31:0] at row time. At column time, it must shift the address on its bus to align column addresses to the row addresses already latched by the DRAMs. In addition the row address is supplied on row/column address bus RCA[16:0] during row time and the column address is supplied on row/column address bus RCA[16:0] during column time. In order to properly align the column addresses, multiprocessor integrated circuit 100 must know the array size of the DRAM it is accessing since the array size determines the number of row/column address bits of the device. This is done selection is made using the address shift bits AS[2:0] and bus size bits BS[1:0] as shown below in Table 10. Note the "X X X" for the address shift bits AS[2:0] for the column cycle indicates that the column cycle does not depend upon the address shift bits AS[2:0].

TABLE 10

| Cycle | AS[2:0] | BS[1:0] | Logical address bits output on RCA[16:0] |
|---|---|---|---|
| Row | 1 1 1 | 1 1 | — — 31 30 29 28 27 26 25 24 23 22 21 20 19 18 17 |
| Row | 1 1 1 | 1 0 | — 31 30 29 28 27 26 25 24 23 22 21 20 19 18 17 16 |
| Row | 1 1 0 | 1 1 | |
| Row | 1 1 1 | 0 1 | 31 30 29 28 27 26 25 24 23 22 21 20 19 18 17 16 15 |
| Row | 1 1 0 | 1 0 | |
| Row | 1 0 1 | 1 1 | |
| Row | 1 1 1 | 0 0 | 30 29 28 27 26 25 24 23 22 21 20 19 18 17 16 15 14 |
| Row | 1 1 0 | 0 1 | |
| Row | 1 0 1 | 1 0 | |
| Row | 1 0 0 | 1 1 | |
| Row | 1 1 0 | 0 0 | 29 28 27 26 25 24 23 22 21 20 19 18 17 16 15 14 13 |
| Row | 1 0 1 | 0 1 | |
| Row | 1 0 0 | 1 0 | |
| Row | 0 1 1 | 1 1 | |
| Row | 1 0 1 | 0 0 | 28 27 26 25 24 23 22 21 20 19 18 17 16 15 14 13 12 |
| Row | 1 0 0 | 0 1 | |
| Row | 0 1 1 | 1 0 | |
| Row | 0 1 0 | 1 1 | |
| Row | 1 0 0 | 0 0 | 27 26 25 24 23 22 21 20 19 18 17 16 15 14 13 12 11 |
| Row | 0 1 1 | 0 1 | |
| Row | 0 1 0 | 1 0 | |
| Row | 0 0 1 | 1 1 | |
| Row | 0 1 1 | 0 0 | 26 25 24 23 22 21 20 19 18 17 16 15 14 13 12 11 10 |
| Row | 0 1 0 | 0 1 | |
| Row | 0 0 1 | 1 0 | |
| Row | 0 1 0 | 0 0 | 25 24 23 22 21 20 19 18 17 16 15 14 13 12 11 10 9 |
| Row | 0 0 1 | 0 1 | |
| Row | 0 0 1 | 0 0 | 24 23 22 21 20 19 18 17 16 15 14 13 12 11 10 9 8 |
| Row | 0 0 0 | 1 1 | 19 18 17 16 15 14 13 12 11 10 9 8 7 6 5 4 3 |
| Col | X X X | 1 1 | |
| Row | 0 0 0 | 1 0 | 18 17 16 15 14 13 12 11 10 9 8 7 6 5 4 3 2 |
| Col | X X X | 1 0 | |
| Row | 0 0 0 | 0 1 | 17 16 15 14 13 12 11 10 9 8 7 6 5 4 3 2 1 |

TABLE 10-continued

| Cycle | AS[2:0] | BS[1:0] | Logical address bits output on RCA[16:0] |
|---|---|---|---|
| Col | X X X | 0 1 | |
| Row | 0 0 0 | 0 0 | 16 15 14 13 12 11 10 9 8 7 6 5 4 3 2 1 0 |
| Col | X X X | 0 0 | |

Since transfer controller 80 performs page-mode cycles whenever possible, it needs to know when it crosses a page or row boundary for the memory it is currently accessing so that it can perform a row access on the new page. The page size for the current access and the number of bits compared for determining a new page are indicated by the combination of page size bits PS[2:0] and bus size bits BS[1:0]. Transfer controller 80 uses this data to determine which changing address bits indicate a page change.

Figure 13:
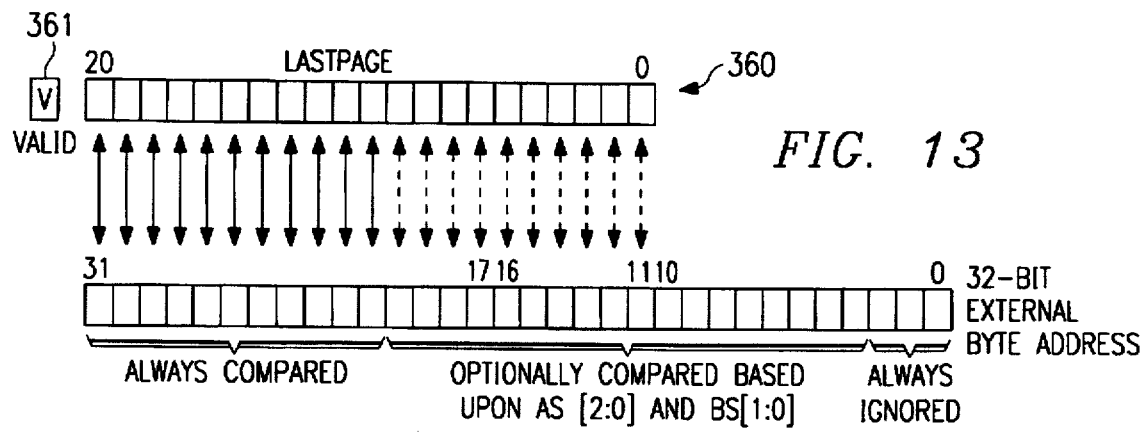
FIG. 13 illustrates the use of a LASTPAGE register.

Whenever an external memory access occurs, transfer controller 80 records the 21 most significant bits of the address in an internal LASTPAGE register 360. The address of each subsequent column access is then compared to this value. This is diagrammed in FIG. 13. The LASTPAGE register bits below the value indicated in Table 11 are ignored in the comparison. The 11 most significant bits are always compared and the 3 least significant bits of the next address are always ignored. If no match is found between the enabled bits of LASTPAGE register 360 and the next memory address, then the page has changed and the next memory access will begin with a row address cycle. If page size selection PS[3:0]="0000" with any coding of BS[1:0] (BS[1:0]="XX") then page mode is disabled and any subsequent cycles will begin with another row access.

TABLE 11

| PS [3:0] | | | | BS [1:0] | | Logical Address Bits Compared | Lowest Pin Compared |
|---|---|---|---|---|---|---|---|
| 0 | 0 | 0 | 0 | X | X | None | None |
| 0 | 0 | 0 | 1 | 0 | 0 | 31:3 | RCA [3] |
| | | | | 0 | 1 | 31:4 | |
| | | | | 1 | 0 | 31:5 | |
| | | | | 1 | 1 | 31:6 | |
| 0 | 0 | 1 | 0 | 0 | 0 | 31:4 | RCA [4] |
| | | | | 0 | 1 | 31:5 | |
| | | | | 1 | 0 | 31:6 | |
| | | | | 1 | 1 | 31:7 | |
| 0 | 0 | 1 | 1 | 0 | 0 | 31:5 | RCA [5] |
| | | | | 0 | 1 | 31:6 | |
| | | | | 1 | 0 | 31:7 | |
| | | | | 1 | 1 | 31:8 | |
| 0 | 1 | 0 | 0 | 0 | 0 | 31:6 | RCA [6] |
| | | | | 0 | 1 | 31:7 | |
| | | | | 1 | 0 | 31:8 | |
| | | | | 1 | 1 | 31:9 | |
| 0 | 1 | 0 | 1 | 0 | 0 | 31:7 | RCA [7] |
| | | | | 0 | 1 | 31:8 | |
| | | | | 1 | 0 | 31:9 | |
| | | | | 1 | 1 | 31:10 | |
| 0 | 1 | 1 | 0 | 0 | 0 | 31:8 | RCA [8] |
| | | | | 0 | 1 | 31:9 | |
| | | | | 1 | 0 | 31:10 | |
| | | | | 1 | 1 | 31:11 | |
| 0 | 1 | 1 | 1 | 0 | 0 | 31:9 | RCA [9] |
| | | | | 0 | 1 | 31:10 | |
| | | | | 1 | 0 | 31:11 | |
| | | | | 1 | 1 | 31:12 | |
| 1 | 0 | 0 | 0 | 0 | 0 | 31:10 | RCA [10] |
| | | | | 0 | 1 | 31:11 | |
| | | | | 1 | 0 | 31:12 | |
| | | | | 1 | 1 | 31:13 | |
| 1 | 0 | 0 | 1 | 0 | 0 | 31:11 | RCA [11] |

TABLE 11-continued

| PS [3:0] | | | | BS [1:0] | | Logical Address Bits Compared | Lowest Pin Compared |
|---|---|---|---|---|---|---|---|
| | | | | 0 | 1 | 31:12 | |
| | | | | 1 | 0 | 31:11 | |
| | | | | 1 | 1 | 31:14 | |
| 1 | 0 | 1 | 0 | 0 | 0 | 31:12 | RCA [12] |
| | | | | 1 | 0 | 31:13 | |
| | | | | 0 | 1 | 31:14 | |
| | | | | 1 | 1 | 31:15 | |
| 1 | 0 | 1 | 1 | 0 | 0 | 31:13 | RCA [13] |
| | | | | 0 | 1 | 31:14 | |
| | | | | 1 | 0 | 31:15 | |
| | | | | 1 | 1 | 31:16 | |
| 1 | 1 | 0 | 0 | 0 | 0 | 31:14 | RCA [14] |
| | | | | 0 | 1 | 31:15 | |
| | | | | 1 | 0 | 31:16 | |
| | | | | 1 | 1 | 31:17 | |
| 1 | 1 | 0 | 1 | 0 | 0 | 31:15 | RCA [15] |
| | | | | 0 | 1 | 31:16 | |
| | | | | 1 | 0 | 31:17 | |
| | | | | 1 | 1 | 31:18 | |
| 1 | 1 | 1 | 0 | 0 | 0 | 31:16 | RCA [16] |
| | | | | 0 | 1 | 31:17 | |
| | | | | 1 | 0 | 31:18 | |
| | | | | 1 | 1 | 31:19 | |
| 1 | 1 | 1 | 1 | 0 | 0 | 31:17 | RCA [17] |
| | | | | 0 | 1 | 31:18 | |
| | | | | 1 | 0 | 31:19 | |
| | | | | 1 | 1 | 31:20 | |

The LASTPAGE register 360 has an associated valid bit 361. This valid bit 361 indicates whether the data stored in LASTPAGE register 360 is treated as valid or invalid. The LASTPAGE register 360 is treated as invalid after reset, host accesses, faults, and retries, or after a change in direction of the access, i.e. read versus write. This forces a row access to always occur before subsequent accesses. In addition, LASTPAGE register 360 is considered invalid both before and after refresh cycles, frame controller 90 requested cycles, and packet transfer generated serial register transfer cycles so that these always occur as single non-page-mode cycles. In the special case of peripheral device packet transfers, the transfers will always begin with a row access to ensure that the peripheral device transfer status code is output. The data in LASTPAGE register 360 will be considered invalid at the completion of the transfer so that a new status code may be output. During the transfer, however, LASTPAGE register 360 will behave normally to allow the peripheral device transfer to use page-mode cycles wherever possible.

Figure 14:
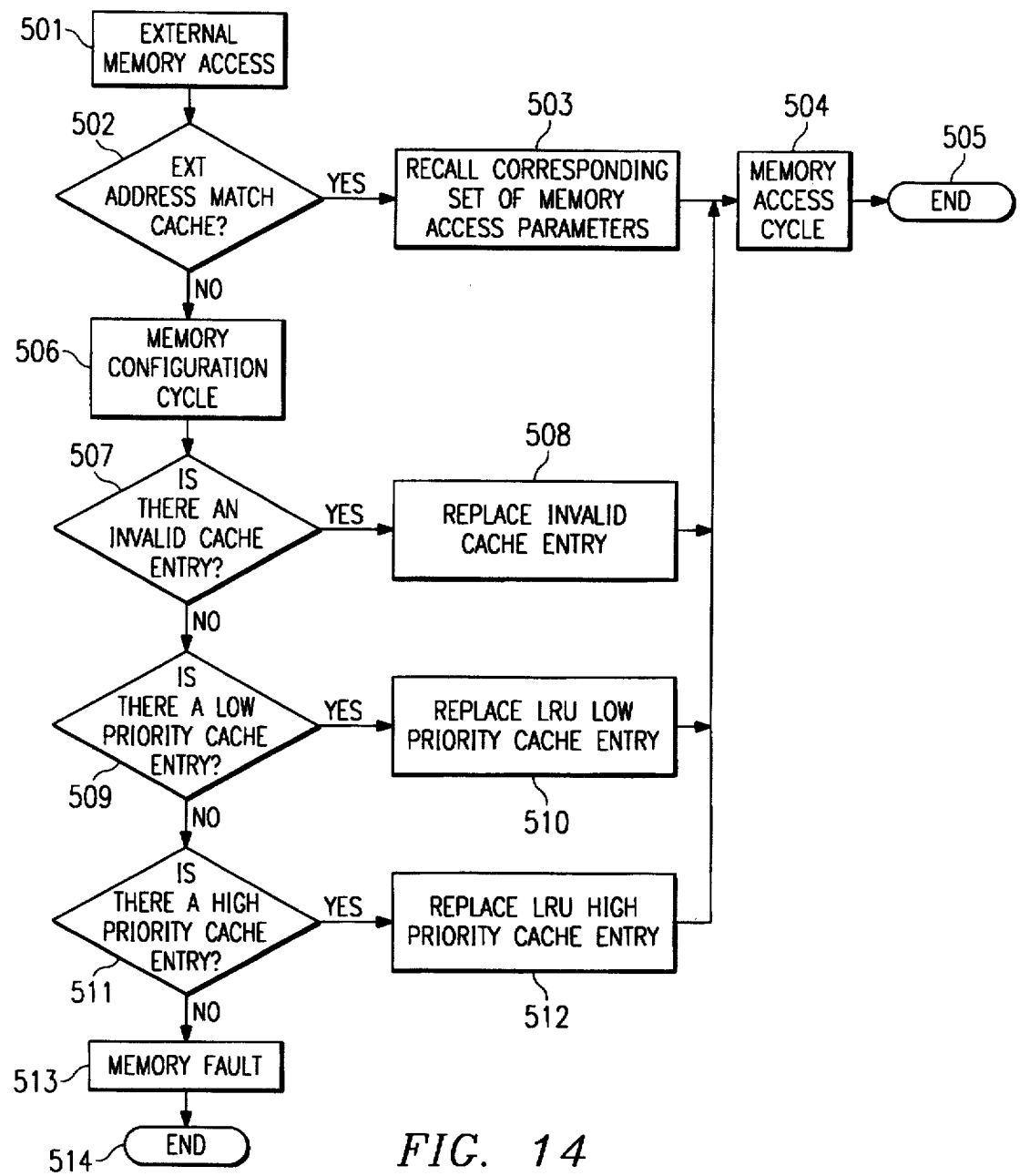
FIG. 14 illustrates the sequence of operations of the memory cache controller.

FIG. 14 illustrates the sequence of operation of memory configuration cache 305. The process begins with an external memory access at block 501. Memory configuration cache 305 tests to determine if the received external address matches the address range of any of the cache entries in decision block 502. If there is such a match, memory configuration cache 305 recalls the set of memory access parameters corresponding to the matched cache entry in block 503. External memory interface 302 performs the external memory access using a memory protocol corresponding to the just recalled memory access parameters in block 504. That completes the memory access cycle at end block 505.

Memory configuration cache 305 triggers a memory configuration cycle in block 506, if there is no cache entry match in decision block 502. During the memory configuration cycle multiprocessor integrated circuit 100 signals memory configuration cache service unit 17 to provide the memory bank size and the set of memory parameters corresponding to the external memory address. In accordance with the preferred embodiment, memory configuration cache unit 17 supplies the memory access parameters in four 8 bit data cycles to either AD[7:0] in little endian mode or AD[63:56] in big endian mode as illustrated in FIG. 10. As previously described the particular one of the four data cycles is specified via RCA[1:0] as shown in FIG. 10.

Following receipt of the memory access parameters, memory configuration cache 305 determines which prior cache entry to replace. Memory configuration cache 305 determines if any of the cache entries are invalid at decision block 507. This would ordinarily occur shortly following initial application of electrical power or reset. If there is at least one invalid cache entry, then memory configuration cache 305 replaces an invalid cache entry and marks the new cache entry valid at block 508. In the preferred embodiment, the generated external address is stored in the cache address 411. The expanded memory bank size MS is stored in mask 412. Memory access parameters section 420 stores memory exception bit E 421, priority level bits PL[1:0] 422, extra turn-off cycle bits TO[1:0] 423, cycle timing bits CT[3:0] 424, page size bits PS[3:0] 425, address shift bits AS[2:0] 426, block write bits BW[1:0] 427, bus size bits BS[1:0] 428 and valid bit V 429. Following the storage of the cache entry, memory interface 302 performs the external memory access using a memory protocol corresponding to the just received memory access parameters in block 504. This completes the memory access cycle at end block 505.

If there are no invalid cache entries, memory configuration cache 305 determines if any of the cache entry has a priority level PL[1:0] indicating a low priority at decision block 509. If there is such a cache entry, then the least recently used of the cache entries having a low priority is replaced at block 510. Following the storage of the cache entry, memory interface 302 performs the external memory access using a memory protocol corresponding to the just received memory access parameters in block 504. This completes the memory access cycle at end block 505.

If there is no low priority cache entry, then memory configuration cache 305 checks to determine if there is a high priority cache entry in decision block 511. Then the least recently used of the cache entries having a high priority is replaced at block 512. The cache entry is replaced as noted above. Following the storage of the cache entry, memory interface 302 performs the external memory access using a memory protocol corresponding to the just received memory access parameters in block 504. This completes the memory access cycle at end block 505.

If there is neither a low priority cache entry nor a high priority cache entry, then all the cache entries are locked. Since none of the cache entries can be replaced, memory configuration cache 305 signals a memory fault at block 513. This completes the memory access cycle at end block 514.

Those skilled in the are would realize that FIG. 14 illustrates merely a convenient design choice implementing this invention. The modification to FIG. 14 to extend this technique to more or fewer priority levels would be readily apparent from the principles shown here. In addition, elimination of the locked level could be implemented by merely replacing the least recently used cache entry of the highest level if all cache entries have the highest cache level, eliminating the memory fault.

In the contemplated embodiment illustrated in FIG. 5, multiprocessor integrated circuit 100 external memory cycles are generated by external memory interface 302 of transfer controller 80. External memory interface 302 contains a complex state machine which generates a sequence of states to control the transition of the memory interface signals. The states generated and their sequence vary based on the type of cycle being performed, the column timing of the memory being accessed, the next access to be performed, and internal or external events such as faults, etc. Though the contemplated embodiment includes a state machine, those skilled in the are would realize that these functions may be preformed by a microcontroller having a fixed program in read only memory or by a programmable microprocessor.

Each external memory cycle generated by multiprocessor integrated circuit 100 is a least 5 machine states in duration except for page-mode cycles. A machine state is one clock period long and begins on the falling edge of CLKOUT. Each memory cycle has two-parts; the address subcycle, and the data subcycle. Page mode cycles are an extension of this form wherein an access has one address subcycle and multiple data subcycles.

The address subcycle begins with the first machine state of the external memory cycle and is at least four machine states long. The address and status code for the access are output at this time. This portion of the cycle is also called the row address time because the row address for DRAMs and VRAMs is latched at this time.

The address/data bus AD[31:0] outputs a 32 bit address that points to the beginning byte of the 64 bit word currently being accessed. The access may be anywhere from 1 to 8 bytes depending on the starting byte and the amount of data to be transferred. During a memory configuration cycle this address is used to decode multiprocessor integrated circuit 100 external memory space. The external decode logic then sends a number of signals back to multiprocessor integrated circuit 100 which are stored in memory configuration cache 305. This information is used to determine the length of the address subcycle as well as the length, addressing, and number of the data subcycles. The address and status may be latched with $\overline{RL}$ or $\overline{RAS}$.

The address subcycle will be automatically extended by an integral number of machine states beyond four machine states as required by the type of access being performed. It may also be extended by the insertion of wait states. This subcycle is at least one machine state long and immediately follows the address subcycle. The column address for DRAMs and VRAMs is output at this time and data is transferred between multiprocessor integrated circuit 100 and external memory. This portion of the memory cycle is often called the column address time.

The address/data bus AD[63:0] transfers the data between multiprocessor integrated circuit 100 and external memory. Data is either driven out for a write cycle or latched in for a read cycle. The position of valid data on the bus is determined by the endian mode of multiprocessor integrated circuit 100, the amount of data being transferred, and the width of the memory.

The column address output during this time is a shifted version of the 32 bit byte address. The alignment of addresses on the row/column address bus RCA[16:0] bus is determined by the address shift selection AS value stored in memory configuration cache 305.

The length of the data subcycle is normally 1, 2, or 3 machine states as determined by the column timing selection CT[3:0] value stored in memory configuration cache. Devices requiring longer access times may insert wait states in either the address or the data subcycle.

Whenever the current memory access is the same direction and is within the same memory page as the previous access based on the page size selection PS stored in memory configuration cache 305, transfer controller 80 will use page-mode cycles. Page-mode cycles consist of one address subcycle followed by multiple data subcycles. Data need not be contiguous, only within the same memory page.

Figure 15:
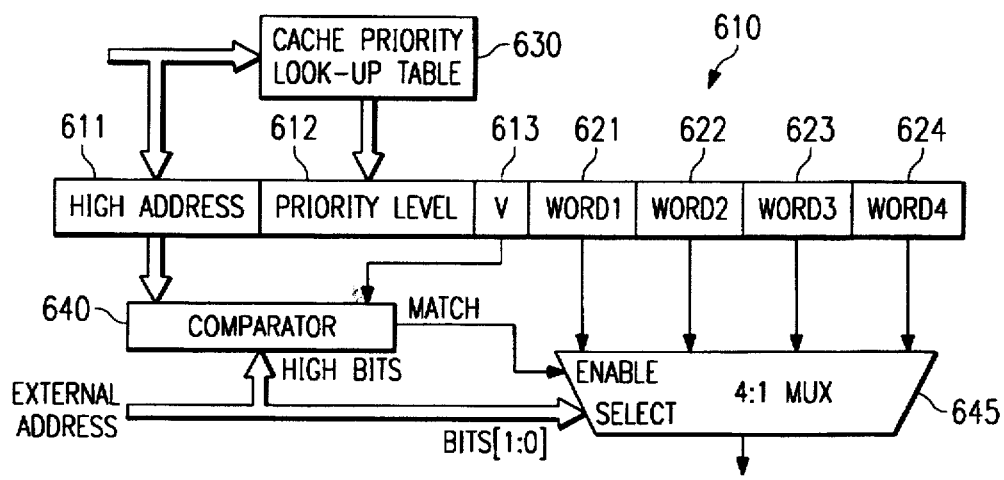
FIG. 15 illustrates the circuits associated with a cache entry in accordance with an alternative embodiment of this invention.
Figure 16:
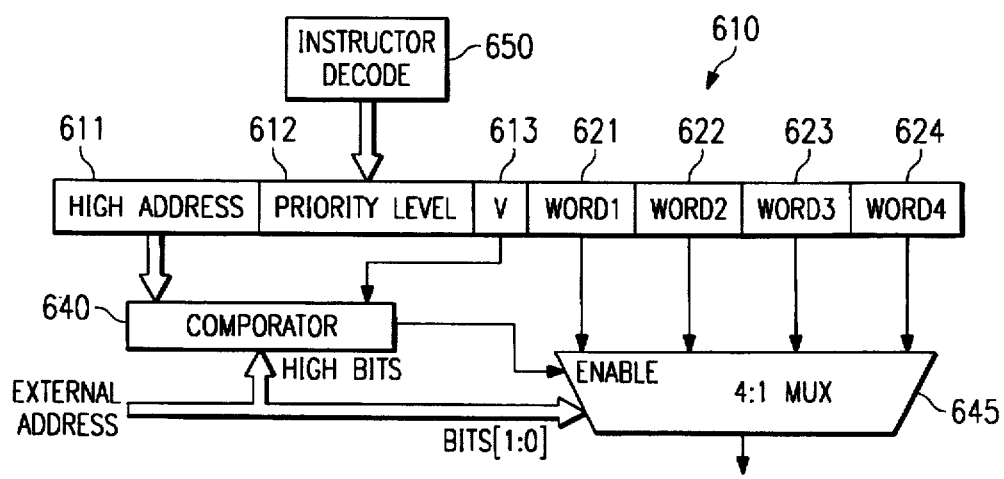
FIG. 16 illustrates the circuits associated with a cache entry which is a further alternative of the embodiment illustrated in FIG. 15.

FIGS. 15 and 16 illustrate another use of the cache entry priority level of this application. FIG. 15 illustrates an ordinary cache entry 610 employing cache priority level. Cache entry 610 includes high address bits 611 corresponding to the memory address at which WORD1, WORD2, WORD3 and WORD4 are stored. Cache entry 610 includes priority level PL, which may include two bits encoded as shown in Table 4 or which may optionally include more or fewer bits encoding various cache priority levels. Cache entry 610 includes valid bit 613, which indicates whether the cache entry is valid. Lastly, cache entry 610 includes WORD1 621, WORD2 622, WORD3 623 and WORD4 624, which are separately addressable words from the memory. WORD1 621, WORD2 622, WORD3 623 and WORD4 624 may be either instruction words or data words depending upon the use of the cache.

Comparator 640 receives the most significant bits of the external address of the proposed external memory access, high address bits 611 and valid bit 613. Comparator 640 generates a match output if the most significant bits of the external address and the cache address 611 are equal and valid bit 613 indicates a valid cache entry. The 4:1 multiplexer 645 receives the match signal from comparator 640, the two least significant bits of the external address Bits [1:0], and the cache words WORD1 621, WORD2 622, WORD3 623 and WORD4 624. If enabled by the match signal, 4:1 multiplexer 645 selects one of the cache words WORD1 621, WORD2 622, WORD3 623 and WORD4 624 based upon the status of address Bits[1:0]. Note that the selection of two address bits selecting between four cache words illustrated in FIGS. 15 and 16 is merely a convenient design choice. It is very possible to employ more or fewer least significant bits of the address to select between corresponding numbers of words in the cache entry 610.

FIG. 15 illustrates cache priority look-up table 630 which supplies the priority level to the individual cache entries. Each time a cache entry 610 is filled the high address bits 611 is also supplied to cache priority look-up table 630. Cache priority look-up table supplies the priority level corresponding to that address for storage as priority level 612. In the preferred embodiment cache priority look-up table 630 stores the priority level assigned to each address range. Cache priority look-up table 630 supplies the priority level of the address range encompassing the address of the cache entry currently being stored. Cache priority look-up table may be a read only memory permanently storing address range/priority levels or may be a read write memory loaded with the address range/priority levels upon initial application of electrical power and following reset.

FIG. 16 illustrates a further alternative of this invention. FIG. 16 is identical to FIG. 15 except that the priority level of each cache entry 610 comes from instruction decode 650. For an instruction cache each instruction may be coded with a cache priority level to be assigned to that instruction when cached. Preferably priority level 612 stores the highest priority level of any of the cache words WORD1 621, WORD2 622, WORD3 623 and WORD4 624. In the alternative, each set of words such as WORD1 621, WORD2 622, WORD3 623 and WORD4 624 stored in memory include a cache priority instruction word which indicates the cache priority level. This cache priority instruction word when executed sets the priority level of the cache entry which contains it. A predetermined priority level, such as the Low priority level, is assigned to each cache entry prior to execution of such a cache priority instruction word. Because higher priority levels should be attached only to time critical instructions, which will generally be few in number, the overhead to store cache priority instruction word will not be very great.

A cache using the cache entry as illustrated in FIGS. 15 or 16 uses a multilevel least recently used technique to select cache entries to be replaced when storing new cache entries. As shown in FIG. 14, the least recently used cache entry of the lowest priority level present in the cache is replaced by the new cache entry. If all the cache entries are locked, then a memory fault occurs.

This invention has the following advantages over the prior art adaptable memory interface. This invention requires no extra pins for inputting the memory configuration data because it uses the data bus. The memory configuration cycle itself is slow, the number of memory configuration cycles will typically be small, so the overall bandwidth overhead they require will be less than that required to read the memory configuration upon every row access. If the number of different bank configurations required is less than or equal to the number of cache entries provided by the processor, then each memory bank will only require one memory configuration cycle. Although slightly more memory configuration data is required relative to the prior art due to the field indicating the address range for the memory bank, the data required by this invention can be contained in a small external ROM or register file. This is be cheaper to implement than the decode logic required by the prior art adaptable memory configuration cycle.

I claim:

1. A method for accessing memory based upon a received address corresponding to storage location to be accessed comprising the steps of:

storing a plurality of memory configuration cache entries, each memory configuration cache entry including an address range and a corresponding set of memory access parameters;

comparing a received address to said address range of each of said memory configuration cache entries;

selecting a set of memory access parameters by
if said received address matches said address range of any one of said memory configuration cache entries, then selecting said set of memory access parameters corresponding to said matching one of said plurality of address ranges,
if said received address fails to match said address range of any of said memory configuration cache entries, then
signalling an address range miss,
outputting said received address,
receiving a memory configuration cache entry including an address range encompassing said received address and a corresponding set of memory access parameters,
storing said memory configuration cache entry, and
selecting said set of memory access parameters of said received memory configuration cache entry; and providing a memory access cycle corresponding to said selected set of memory access parameters.

2. The method of accessing memory of claim 1, wherein:

said step of storing said received memory configuration cache entry consists of replacing a prior stored memory configuration cache entry least recently used.

3. The method of accessing memory of claim 1, wherein:

said received address consists of a multibit address word having a predetermined number of bits;

said address range of each of said memory configuration cache entries includes a multibit address cache word having said predetermined number of bits and a memory bank size indicating a number of most significant bits to be compared; and said step of comparing a received address to said address range of each of said memory configuration cache entries includes detecting if said number of most significant bits indicated by said memory bank size of memory configuration cache entry of said received address equals said number of most significant bits indicated by said memory bank size of said corresponding multibit address cache word.

4. The method of accessing memory of claim 3, wherein:

said step of receiving said memory configuration cache entry includes receiving said memory bank size;

said step of storing said memory configuration cache entry includes
  forming a mask having said predetermined number of bits, said mask having a number of most significant bits equal to said number of most significant bits of said memory bank size in a first digital state and having remaining bits in a second digital state opposite said first digital state, and storing said mask,
  storing a cache address equal to said received address which resulted in signaling said address range miss for that memory configuration cache entry; and said step of comparing said received address with said address range of each of said memory configuration cache entries includes comparing said cache address and said received address as masked by said mask, wherein bits where said mask is in said second digital state always indicate a match.

5. The method of accessing memory of claim 3, wherein:

said step of receiving said memory configuration cache entry includes receiving said memory bank size;

said step of storing said memory configuration cache entry includes
  storing said memory bank size, and
  storing a cache address equal to said received address which resulted in signaling said address range miss for that memory configuration cache entry; and said step of comparing said received address with said address range of each of said memory configuration cache entries includes
  forming a mask having said predetermined number of bits, said mask having a number of most significant bits equal to said number of most significant bits of said stored memory bank size in a first digital state and having remaining bits in a second digital state opposite said first digital state, and
  comparing said cache address and said received address as masked by said mask, wherein bits where said mask is in said second digital state always indicate a match.

6. The method of accessing memory of claim 1, wherein:

said received address consists of a multibit address word having a predetermined number of bits;

said address range of each of said memory configuration cache entries includes a top address cache word having said predetermined number of bits and a bottom address cache word having said predetermined number of bits; and said step of comparing a received address to said address range of each of said memory configuration cache entries includes detecting if said received address is less than or equal to said top address cache word and greater than or equal to said bottom address cache word.

7. The method of accessing memory of claim 1, wherein:

said set of memory access parameters of each of said memory configuration cache entries includes an indication of one of a predetermined set of timing parameters for memory access.

8. The method of accessing memory of claim 1, wherein:

said set of memory access parameters of each of said memory configuration cache entries includes an indication of a page size for memory access.

9. The method of accessing memory of claim 1, wherein:

said set of memory access parameters of each of said memory configuration cache entries includes an indication of a data bus size;

said step of providing said memory access cycle corresponding to said selected set of memory access parameters includes employing a selected portion of a data bus for data transfer having a number of bits corresponding to said indication of said data bus size.

10. The method of accessing memory of claim 1, wherein:

said set of memory access parameters of each of said memory configuration cache entries includes an indication of which bits to supply during a row address cycle and which bit to supply during a column address cycle for accessing a dynamic random access memory.

11. The method of accessing memory of claim 1, wherein:

said step of receiving said memory configuration cache entry includes receiving said address range and said set of memory access parameters via plural data transfers on a selected portion of less than all of a data bus for data transfer.

12. A memory access controller comprising:

a memory address generator for generating an address for access to a memory;

a memory configuration cache having a predetermined plurality of memory configuration cache entries, each memory configuration cache entry including an address range and a corresponding set of memory access parameters;

a comparator connected to said memory address generator and said memory configuration cache comparing said address to said address range of each of said memory configuration cache entries;

a memory interface connected to said memory configuration cache and said comparator, said memory interface selecting a set of memory access parameters by
  if said received address matches said address range of any one of said memory configuration cache entries, then selecting said set of memory access parameters corresponding to said matching one of said plurality of address ranges,
  if said received address fails to match said address range of any of said memory configuration cache entries, then signalling an address range miss,
outputting said received address,
receiving a memory configuration cache entry including an address range encompassing said received address and a corresponding set of memory access parameters,
storing said memory configuration cache entry,
selecting said set of memory access parameters of said received memory configuration cache entry, and said memory interface further providing a memory access cycle corresponding to said selected set of memory access parameters.

13. The memory access controller of claim 12, wherein:
said memory interface stores said received memory configuration cache entry by replacing a prior stored memory configuration cache entry least recently used.

14. The memory access controller of claim 12, wherein:
said address generator generates an address consisting of a multibit address word having a predetermined number of bits;
said address range of each of said memory configuration cache entries includes a multibit address cache word having said predetermined number of bits and a memory bank size indicating a number of most significant bits to be compared; and
said comparator compares said address to said address range of each of said memory configuration cache entries by detecting if said number of most significant bits indicated by said memory bank size of memory configuration cache entry of said address equals said number of most significant bits indicated by said memory bank size of said corresponding multibit address cache word.

15. The memory access controller of claim 14, further comprising:
an expander having an input receiving said memory bank size and an output forming a mask having said predetermined number of bits, said mask having a number of most significant bits equal to said number of most significant bits of said memory bank size in a first digital state and having remaining bits in a second digital state opposite said first digital state;
said memory configuration cache being connected to said expander and storing said address cache word and said mask for each memory configuration cache entry;
said comparator being connected to said memory configuration cache to receive said address cache data word and said mask, said comparator comparing said cache address and said received address as masked by said mask, wherein bits where said mask is in said second digital state always indicate a match.

16. The memory access controller of claim 14, wherein:
said memory configuration cache stores said address cache word and said memory bank size for each memory configuration cache entry;
said memory access controller further comprising an expander having an input receiving said memory bank size from said memory configuration cache and an output forming a mask having said predetermined number of bits, said mask having a number of most significant bits equal to said number of most significant bits of said memory bank size in a first digital state and having remaining bits in a second digital state opposite said first digital state;
said comparator being connected to said memory configuration cache to receive said address cache data word and connected to said expander to receive said mask, said comparator comparing said cache address and said received address as masked by said mask, wherein bits where said mask is in said second digital state always indicate a match.

17. The memory access controller of claim 12, wherein:
said address generator generates said address consisting of a multibit address word having a predetermined number of bits;
said address range of each of said memory configuration cache entries includes a top address cache word having said predetermined number of bits and a bottom address cache word having said predetermined number of bits; and
said comparator includes
a first comparator connected to said address generator and said top address cache word for detecting if said address is less than or equal to said top address cache word,
a second comparator connected to said address generator and said bottom address cache word for detecting if said address is greater than or equal to said bottom address cache word, and
an AND gate having a first input connected to said first comparator, a second input connected to said second comparator and an output indicating whether there is a match.

18. The memory access controller of claim 12, wherein:
said set of memory access parameters of each of said memory configuration cache entries includes an indication of one of a predetermined set of timing parameters for memory access.

19. The memory access controller of claim 12, wherein:
said set of memory access parameters of each of said memory configuration cache entries includes an indication of a page size for memory access.

20. The memory access controller of claim 12, wherein:
said memory interface includes a data bus having a predetermined number of bits;
said set of memory access parameters of each of said memory configuration cache entries includes an indication of a data bus size;
said memory interface provides said memory access cycle employing a selected portion of said data bus for data transfer having a number of bits corresponding to said indication of said data bus size.

21. The memory access controller of claim 12, wherein:
said set of memory access parameters of each of said memory configuration cache entries includes an indication of which bits to supply during a row address cycle and which bit to supply during a column address cycle for accessing a dynamic random access memory.

22. The memory access controller, of claim 12, wherein:
said memory configuration cache receives said address range and said set of memory access parameters in a plurality of data cycles employing less than all of a data bus for data transfer.

23. A digital data processing system comprising:
a system bus for transmitting data and addresses;
a plurality of memories, each memory connected to said system bus for memory access, each memory responsive to a predetermined range of addresses and requiring a predetermined set of memory access parameters;
a memory configuration cache service unit connected to said system bus, said memory configuration cache service unit storing said predetermined address range and said predetermined set of memory access parameters for each of said plurality of memories, said memory configuration cache service unit supplying on said system bus said predetermined address range and said predetermined set of memory access parameters corresponding to a one of said plurality of memories encompassing a particular memory address received from said system bus during a memory configuration cycle;

a data processor including
  a memory address generator for generating an address for access to one of said plurality of memories,
  a memory configuration cache having a predetermined plurality of memory configuration cache entries, each memory configuration cache entry including an address range and a corresponding set of memory access parameters;
  a comparator connected to said memory address generator and said memory configuration cache comparing said address to said address range of each of said memory configuration cache entries;
  a memory interface connected to said memory configuration cache and said comparator, said memory interface selecting a set of memory access parameters by
    if said received address matches said address range of any one of said memory configuration cache entries, then selecting said set of memory access parameters corresponding to said matching one of said plurality of address ranges,
    if said received address fails to match said address range of any of said memory configuration cache entries, then
      signalling a memory configuration cycle,
      outputting said received address,
      receiving a memory configuration cache entry including an address range encompassing said received address and a corresponding set of memory access parameters from said memory configuration cache service unit,
      storing said memory configuration cache entry,
      selecting said set of memory access parameters of said received memory configuration cache entry, and
  said memory interface further providing a memory access cycle corresponding to said selected set of memory access parameters.

24. The digital data processing system of claim 23, wherein:
  said memory interface stores said received memory configuration cache entry by replacing a prior stored memory configuration cache entry least recently used.

25. The digital data processing system of claim 23, wherein:
  said address generator generates an address consisting of a multibit address word having a predetermined number of bits,
  said address range of each of said memory configuration cache entries includes a multibit address cache word having said predetermined number of bits and a memory bank size indicating a number of most significant bits to be compared, and
  said comparator compares said address to said address range of each of said memory configuration cache entries by detecting if said number of most significant bits indicated by said memory bank size of memory configuration cache entry of said address equals said number of most significant bits indicated by said memory bank size of said corresponding multibit address cache word.

26. The digital data processing system of claim 25, wherein:
  said data processor further includes
    an expander having an input receiving said memory bank size and an output forming a mask having said predetermined number of bits, said mask having a number of most significant bits equal to said number of most significant bits of said memory bank size in a first digital state and having remaining bits in a second digital state opposite said first digital state;
    said memory configuration cache being connected to said expander and storing said address cache word and said mask for each memory configuration cache entry;
    said comparator being connected to said memory configuration cache to receive said address cache data word and said mask, said comparator comparing said cache address and said received address as masked by said mask, wherein bits where said mask is in said second digital state always indicate a match.

27. The digital data processing system of claim 25, wherein:
  said data processor wherein said memory configuration cache stores said address cache word and said memory bank size for each memory configuration cache entry,
  said data processor further including an expander having an input receiving said memory bank size from said memory configuration cache and an output forming a mask having said predetermined number of bits, said mask having a number of most significant bits equal to said number of most significant bits of said memory bank size in a first digital state and having remaining bits in a second digital state opposite said first digital state;
  said data processor wherein said comparator connected to said memory configuration cache to receive said address cache data word and connected to said expander to receive said mask, said comparator comparing said cache address and said received address as masked by said mask, wherein bits where said mask is in said second digital state always indicate a match.

28. The digital data processing system of claim 23, wherein:
  said address generator generates said address consisting of a multibit address word having a predetermined number of bits,
  said address range of each of said memory configuration cache entries includes a top address cache word having said predetermined number of bits and a bottom address cache word having said predetermined number of bits, and
  said comparator includes
    a first comparator connected to said address generator and said top address cache word for detecting if said address is less than or equal to said top address cache word,
    a second comparator connected to said address generator and said bottom address cache word for detecting if said address is greater than or equal to said bottom address cache word, and
    an AND gate having a first input connected to said first comparator, a second input connected to said second comparator and an output indicating whether there is a match.

29. The digital data processing system of claim 23, wherein:

said set of memory access parameters of each of said memory configuration cache entries includes an indication of one of a predetermined set of timing parameters for memory access.

30. The digital data processing system of claim 23, wherein:

said set of memory access parameters of each of said memory configuration cache entries includes an indication of a page size for memory access.

31. The digital data processing system of claim 23, wherein:

said system bus consists of a predetermined number of bits;

said set of memory access parameters of each of said memory configuration cache entries includes an indication of a data bus size;

said memory interface provides said memory access cycle employing a selected portion of said system bus for data transfer having a number of bits corresponding to said indication of said data bus size.

32. The digital data processing system of claim 23, wherein:

said set of memory access parameters of each of said memory configuration cache entries includes an indication of which bits to supply during a row address cycle and which bit to supply during a column address cycle for accessing a dynamic random access memory.

33. The digital data processing system of claim 23, wherein:

said system bus includes a first plurality of lines for transmitting data; and said memory configuration cache service unit supplies said predetermined address range and said predetermined set of memory access parameters in a plurality of data cycles employing less than all of said first plurality of lines.

34. The digital data processing system of claim 23, wherein:

said memory configuration cache service unit is disposed on a first integrated circuit; and said data processor is disposed on a second integrated circuit separate and distinct from said first integrated circuit.

* * * * *